United States Patent [19]

Shinoda et al.

[11] Patent Number: 4,478,184

[45] Date of Patent: Oct. 23, 1984

[54] SPEED CONTROL SYSTEM AND METHOD FOR AUTOMOTIVE VEHICLES

[75] Inventors: Yoshio Shinoda, Aichi; Akira Kuno, Oobu, both of Japan

[73] Assignee: Nippon Soken, Inc., Nishio, Japan

[21] Appl. No.: 465,459

[22] Filed: Feb. 10, 1983

[30] Foreign Application Priority Data

Feb. 15, 1982 [JP] Japan .................. 57-23479

[51] Int. Cl.³ .................. B60K 31/00; F02D 11/10
[52] U.S. Cl. .................. 123/352; 180/179; 364/431.07
[58] Field of Search .................. 123/350, 352–355; 180/176, 179; 364/431.07

[56] References Cited

U.S. PATENT DOCUMENTS

| | | | |
|---|---|---|---|
| 4,250,854 | 2/1981 | Matsui et al. | 123/352 |
| 4,325,336 | 4/1982 | Kuno et al. | 123/350 |
| 4,328,776 | 5/1982 | Kuno et al. | 123/352 |
| 4,359,125 | 11/1982 | Shinoda et al. | 123/352 X |

Primary Examiner—Tony M. Argenbright
Attorney, Agent, or Firm—Cushman, Darby & Cushman

[57] ABSTRACT

In a speed control system for automotive vehicles, a first time difference between values of a timing signal responsive to the actual speed of the vehicle and a command signal indicative of a desired speed is calculated to produce a first differential signal indicative of an absolute value of the first time difference, and a second time difference between respective values of the preceding and following timing signals is calculated to produce a second differential signal indicative of an absolute value of the second time difference and a sign signal indicative of one of positive and negative signs of the second time difference. The absolute value of the second differential signal is adjusted to a smaller value when the sign of the sign signal changes within a duration defined by the preceding and following timing signals, the absolute value of the first differential signal is adjusted in accordance with either one of the absolute and smaller adjusted values of the second differential signal in relation to the sign of the sign signal to produce a correction signal indicative of the adjusted value of the first differential signal, and a control signal is produced in response to the correction signal to control the fuel supply into the prime engine of the vehicle.

9 Claims, 14 Drawing Figures

SPEED CONTROL SYSTEM AND METHOD FOR AUTOMOTIVE VEHICLES

BACKGROUND OF THE INVENTION

The present invention relates to a speed control system and method for automotive vehicles, and more particularly to an improvement of an electronic speed control system and method for an automotive vehicle of the type in which the fuel supply into the engine is controlled in accordance with a difference between the actual speed of the vehicle and a desired command speed in relation to the acceleration of the vehicle.

In such an electronic speed control system as disclosed in U.S. Pat. No. 4,250,854 issued on Feb. 17, 1981, in the name of Matsui et al., a speed-difference calculation circuit is provided to calculate an absolute value of a time difference between a predetermined period of time defined by the desired command speed and an instant period of time responsive to the actual vehicle speed, and an acceleration calculation circuit is further provided to calculate an absolute value of a time difference between the preceding and following instant periods of time responsive to the actual vehicle speed. Thus, a correction signal is produced in dependence upon the calculated absolute values to control the fuel supply into the engine so as to maintain the desired command speed of the vehicle.

In the above speed control system, a conventional speed sensor, for example, in the form of a magnetic pickup type transducer, is mounted, in general, on a portion of the vehicle body structure to detect the instant period of time responsive to the actual vehicle speed. This means that if there occurs an error in operation of the speed sensor due to mechanical vibration of the vehicle body structure, racing of the road wheels or the like, the respective absolute values will be erroneously calculated, resulting in an error of the correction signal for control of the fuel supply into the engine.

SUMMARY OF THE INVENTION

It is, therefore, a primary object of the present invention to provide an improved electronic speed control system and method capable of producing a correction signal for control of the fuel supply as reliably as possible without influence caused by an error in calculation of each absolute value of the respective time differences.

In a preferred embodiment of the present invention, the primary object is accomplished by provision of a speed control system for an automotive vehicle driven by a prime mover under control of control means for controlling the fuel supply into the engine, which the control system comprises:

a timing signal generator for producing a timing signal with a period of time responsive to the actual speed of the vehicle;

a command-speed set circuit for producing a command signal indicative of a predetermined period of time defined by a desired speed of the vehicle;

a speed-difference calculation circuit for calculating a first time difference between the predetermined period of time and an instant period of time of the timing signal and for producing a first differential signal indicative of an absolute value of the calculated first time difference;

an acceleration calculation circuit for calculating a second time difference between respective instant periods of time of the preceding and following timing signals and for producing a second differential signal indicative of an absolute value of the calculated second time difference and a sign signal indicative of one of positive and negative signs of the calculated second time difference;

a correction signal generator for adjusting the absolute value of the first differential signal in accordance with the absolute value of the second differential signal in relation to the sign of the sign signal and for producing a correction signal indicative of the adjusted absolute value of the first differential signal;

a distribution circuit responsive to the correction signal for producing a control signal in relation to the sign of the sign signal; and actuator means for actuating the control means in response to the control signal. In such speed control system, a digit signal generator is provided to adjust the absolute value of the second differential signal to a smaller value when the sign of the sign signal changes within a duration defined by the preceding and following timing signals, and the correction signal generator is arranged to adjust the absolute value of the first differential signal in accordance with the adjusted smaller value of the second differential signal in relation to the sign of the sign signal and to produce a correction signal indicative of the adjusted absolute value of the first differential signal.

It is preferred that the correction signal generator is arranged to be applied in response to the timing signal with a first binary coded signal representing a low-order digit portion of the absolute value of the second differential signal, and the digit signal generator is arranged to be applied in response to the timing signal with the sign signal and a second binary coded signal representing the remaining high-order digit portion of the absolute value of the second differential signal for permitting the second binary coded signal applied to the correction signal generator when the sign of the sign signal is the same within the duration defined by the preceding and following timing signals and for prohibiting the second binary coded signal applied to the correction signal generator when the sign of the sign signal changes within the duration.

In the actual practices of the present invention, the digit signal generator may includes a first logic circuit arranged to be applied in response to the timing signal with the sign signal for discriminating whether or not the sign of the sign signal changes within the duration and for producing an output signal therefrom only when the sign of the sign signal is the same within the duration, and a second logic circuit arranged to be applied with the second binary coded signal for permitting the second binary coded signal applied to the correction signal generator in response to the output signal from the first logic circuit and for prohibiting the second binary coded signal applied to the correction signal generator due to lack of the output signal from the first logic circuit.

BRIEF DESCRIPTION OF THE DRAWINGS

Additional objects and advantages of the present invention will be more readily apparent from the following detailed description of a preferred embodiment thereof when taken together with the accompanying drawings in which.

DETAILED DESCRIPTION OF THE PREFERRED EMBODIMENT

Figure 1:
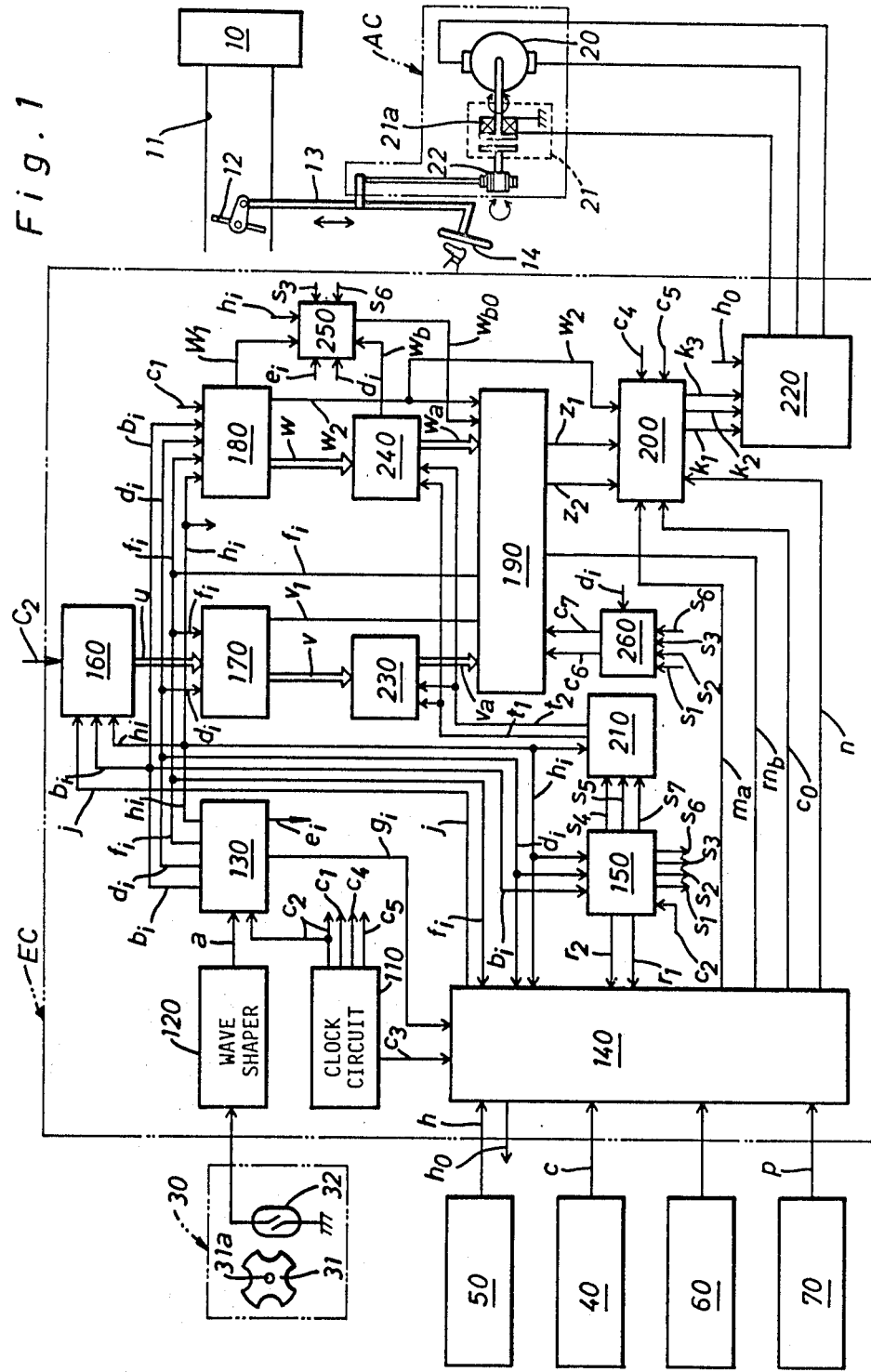
FIG. 1 is a schematic block diagram of a speed control apparatus in accordance with the present invention which is adapted to an automotive vehicle.
Figure 2:
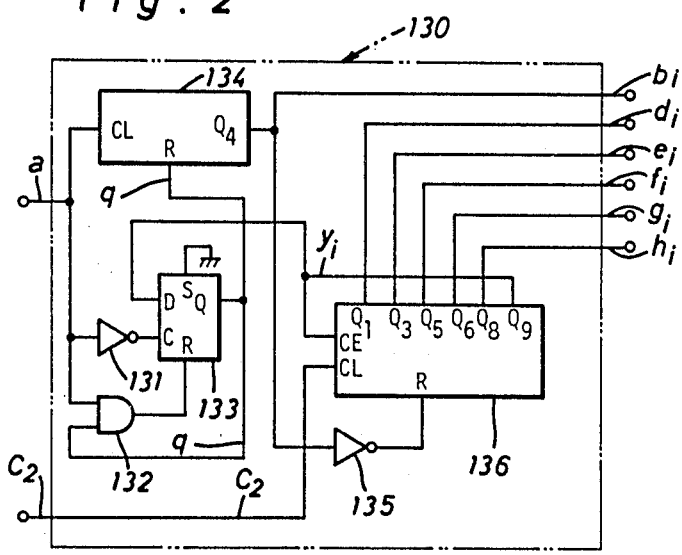
FIG. 2 is a circuit diagram of an embodiment of the timing signal generator shown in block form in FIG. 1.

Referring now to the drawings, in particular to FIG. 1 there is illustrated a speed control apparatus in accordance with the present invention which is adapted to an internal combustion engine 10 of an automotive vehicle. The speed control apparatus comprises a throttle actuator AC which is operatively coupled with a throttle valve 12 provided within an induction passage 11 of engine 10. The throttle actuator AC comprises an electric reversible motor 20 which is coupled with a rack-and-pinion 22 by an electromagnetic clutch mechanism 21. The clutch mechanism 21 is provided with an electromagnetic coil 21a which is energized to engage the clutch mechanism 21 so as to connect the rack-and-pinion 22 to the motor 20. Upon deenergization of the coil 21a, the clutch mechanism 21 is disengaged to disconnect the rack-and-pinion 22 from the motor 20. The rack-and-pinion 22 is linked by a rod 13 with the throttle valve 12 to move the rod 13 downward in dependence upon the clockwise rotation of motor 20 under engagement of clutch mechanism 21 so as to increase the actual opening angle of throttle valve 12. When the motor 20 rotates counterclockwise under engagement of clutch mechanism 21, the rack-and-pinion 22 moves the rod 13 upward to decrease the actual opening angle of throttle valve 12. In addition, an accelerator pedal 14 for the vehicle is linked with the throttle valve 12 through the rod 13 to fully close the throttle valve 12 when released under disengagement of clutch mechanism 21.

Figure 4:
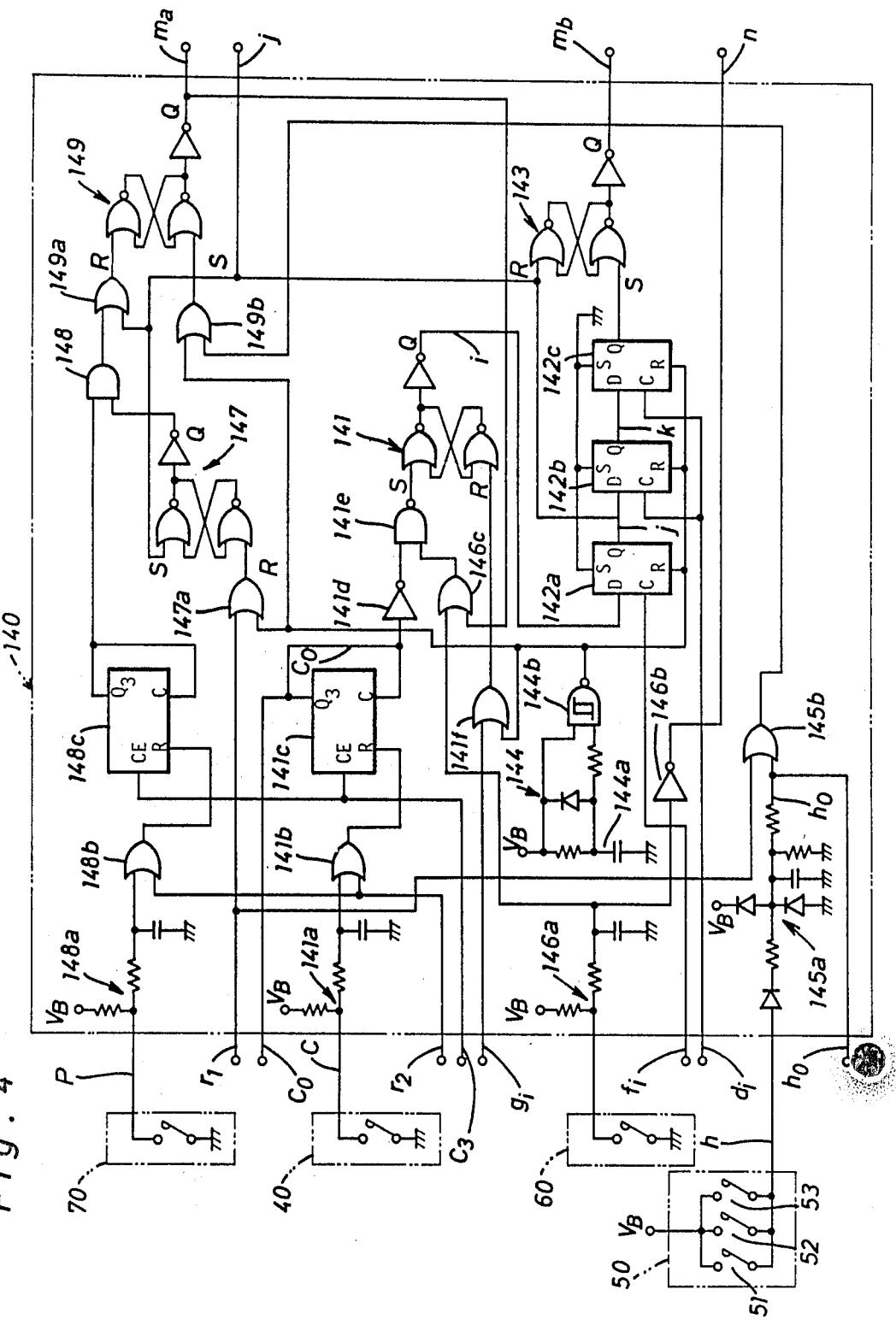
FIG. 4 is a circuit diagram of an embodiment of the control signal generator shown in block form of FIG. 1 in relation to the various switches.
Figure 5:
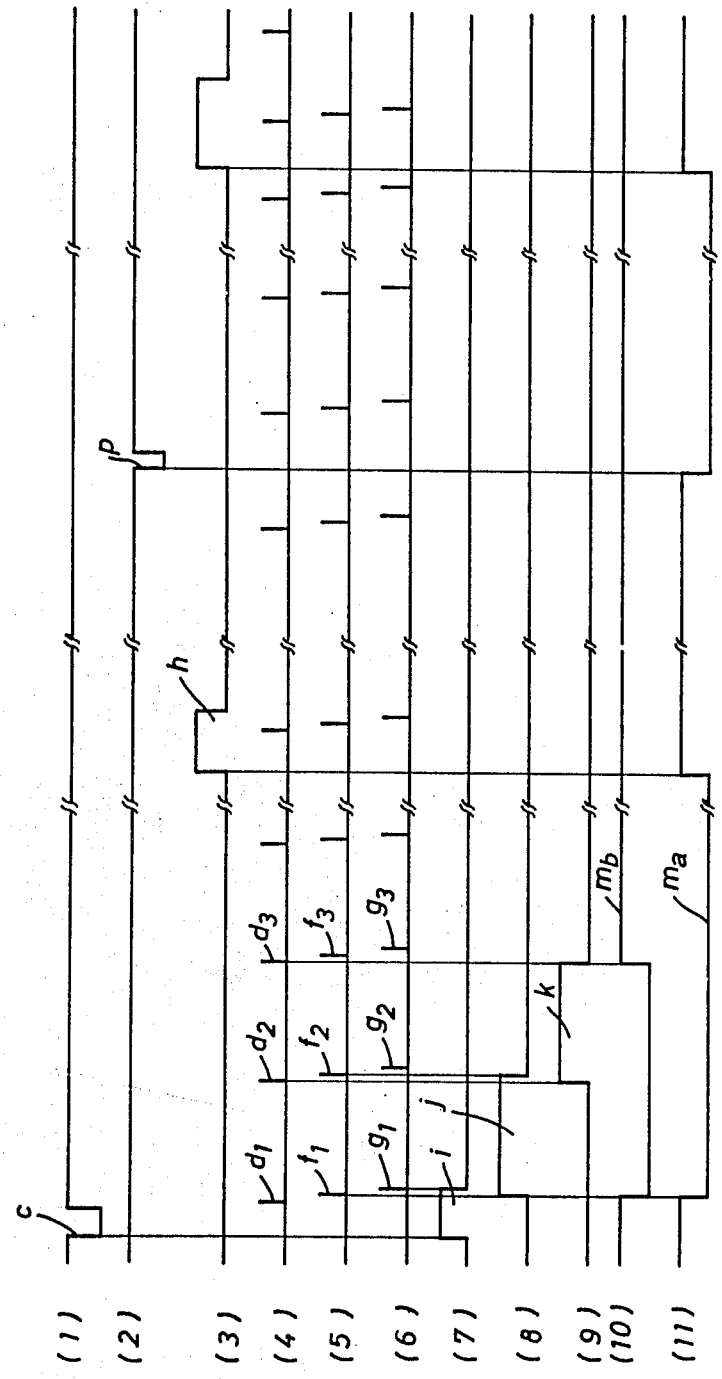
FIG. 5 illustrates waveforms obtained at various points in the timing and control signal generators and various switches.

The speed control apparatus also comprises an electronic control circuit EC which is connected to the throttle actuator AC and also to a speed sensor 30 and various switches 40, 50, 60 and 70. The speed sensor 30 includes a reed switch 32 which is located in magnetic coupling relationship with a disc 31 of permanent magnet coupled with a flexible cable 31a of a speedometer for the vehicle. The reed switch 32 is repetitively opened and closed due to rotation of the disc 31 to produce a series of electric signals respectively with a frequency proportional to the actual vehicle speed. The set switch 40 is of a normally open type, as shown in FIG. 4 and is temporarily closed at a desired or command speed of the vehicle to produce an electric signal c (see FIG. 5). The cancel switch 50 is provided with brake, clutch and parking switches 51, 52 and 53 which are respectively in the form of a normally open type and connected in parallel to each other (see FIG. 4). The brake switch 51 is closed upon depression of a foot brake pedal of the vehicle, the clutch switch 52 is closed upon actuation of a clutch pedal of the vehicle, and the parking switch 53 is also closed upon manipulation of a parking mechanism of the vehicle. When one of the switches 51, 52 and 53 is closed, the cancel switch 50 produces a release signal h (see FIG. 5) for making the control circuit EC inoperative. The acceleration switch 60 is of a normally open type (see FIG. 4) and manually closed to produce an electric signal, and the resume switch 70 is also in the form of a normally open type and manually closed to produce an electric signal p (see FIG. 5).

Figure 3:
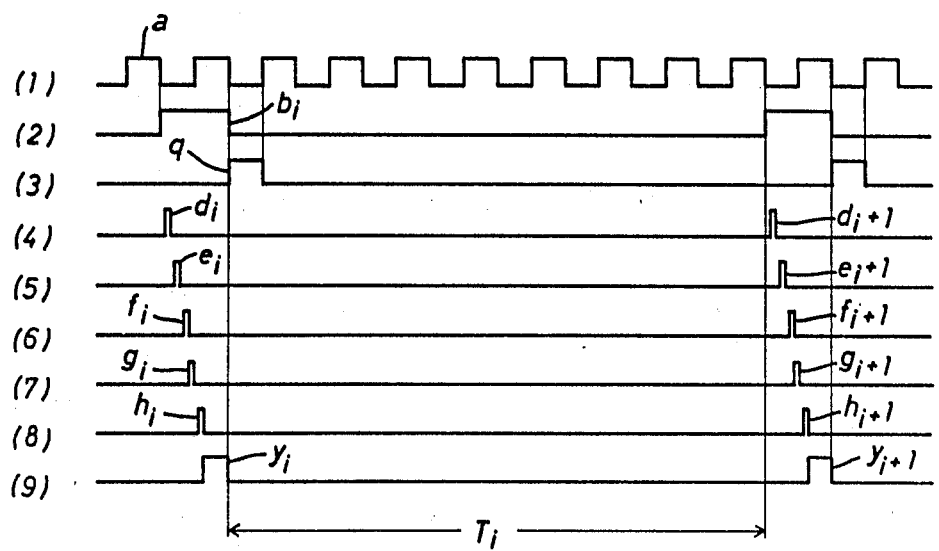
FIG. 3 illustrates waveforms obtained at various points in the timing signal generator.

The electronic control circuit EC includes a clock circuit 110, a timing signal generator 130 connected through a wave shaper 120 to the speed sensor 30, and a control signal generator 140 connected to the switches 40 to 70, clock circuit 110, timing signal generator 130 and a cancellation circuit 150, as shown in FIGS. 1, 2, 4 and 6. The clock circuit 110 acts to produce each series of clock signals $C_1$, $C_2$, $C_3$, $C_4$ and $C_5$, and the wave shaper 120 acts to reshape each of the electric signals from speed sensor 30 into a rectangular pulse signal a (see FIG. 3) in sequence. In the embodiment, frequencies of the clock signals $C_1$, $C_2$, $C_3$, $C_4$ and $C_5$ are determined as, for example, 128 KHz, 8 KHz, 1 KHz, 62.5 Hz and 31.25 Hz respectively. The timing signal generator 130 includes a D-flip flop 133 which is of the CD 4013 type manufactured by RCA in U.S.A. and is connected to the wave shaper 120 through an inverter 131 and an AND-gate 132 (see FIGS. 1, 2). After reset by AND-gate 132, D-flip flop 133 receives a high level signal $y_i$ (see FIG. 3) issued from a decade counter 136, as described below, and generates a high level signal q (see FIG. 3) under control of inverter 131 responsive to the trailing edge of pulse signal a from wave shaper 120. When D-flip flop 133 is again reset by AND-gate 132 in response to the leading edge of a pulse signal a appearing from wave shaper 120 following the above pulse signal a, it acts to drop the high level signal q to a low level.

The timing signal generator 130 also includes a binary counter 134 of the CD 4024 type which is manufactured by RCA. The binary counter 134 is reset by the high level signal q from D-flip flop 133 and counts a series of the pulse signals a from wave shaper 120 to produce a gate signal $b_i$ ($i=1, 2, \ldots$) with a period of time $T_i$ at its output terminal $Q_4$. The period of time $T_i$ of gate signal $b_i$ corresponds to ⅛ of a frequency of the pulse signal a from wave shaper 120, the leading edge of gate signal $b_i$ being in synchronization with the trailing edge of pulse signal a (see FIG. 3). The decade counter 136 is of the CD 4017 type manufactured by RCA and counts a series of the clock signals $C_2$ from clock circuit 110 after reset by an inverter 135 responsive to the leading edge of the gate signal $b_i$ to produce latch signals $d_i$, $e_i$, a preset signal $f_i$, reset signals $g_i$, $h_i$ and the high level signal $y_i$ respectively at its output terminals $Q_1$, $Q_3$, $Q_5$, $Q_6$, $Q_8$ and $Q_9$ in sequence (see FIG. 3). In the embodiment, these signals $d_i$, $e_i$, $f_i$, $g_i$, $h_i$ and $y_i$ are produced during generation of gate signal $b_i$, and the high level signal $y_i$ drops to a low level when the counter 136 is reset by the inverter 135 at the trailing edge of the gate signal $b_i$.

As shown in FIG. 4, the control signal generator 140 is provided with a wave shaper 141a for reshaping the electric signal c from set switch 40 into a reshaped signal, with a wave shaper 145a for reshaping the release signal h from cancel switch 50 into a reshaped signal $h_0$, with a wave shaper 146a for reshaping the electric signal from acceleration switch 60 into a reshaped signal and also with a wave shaper 148a for reshaping the electric signal p from resume switch 70 into a reshaped signal. The control signal generator 140 is further provided with a frequency divider 141c which is connected to the clock circuit 110 and connected through an OR-gate 141b to the wave shaper 141a and cancellation circuit 150. The frequency divider 141c is a CD 4520 type binary counter which is manufactured by RCA. Under control of OR-gate 141b responsive to the reshaped signal from wave shaper 141a or disappearance of a release signal $r_2$ which will be produced from the cancellation circuit 150, as described later, the frequency divider 141c counts a series of the clock signals $C_3$ from clock circuit 110 to produce a high level or set signal $c_0$ indicative of the counted number 4 of the clock signals $C_3$ at its output terminal $Q_3$. This means that the frequency divider 141c acts as a digital low pass filter of approximately 250 Hz which produces a set signal $c_0$ upon lapse of time of about 4 msec after generation of the electric signal c from set switch 40. Additionally, the frequency divider 141c serves to inhibit its count operation in response to the set signal $c_0$ therefrom.

In the control signal generator 140, an RS-flip flop 141 is provided to generate a high level signal i (see FIG. 5) at its output terminal Q under control of a NAND-gate 141e and an inverter 141d responsive to the set signal $c_0$ from frequency divider 141c. The high level signal i is also generated from RS-flip flop 141 under control of NAND-gate 141e and an OR-gate 146c responsive to the reshaped signal from wave shaper 146a or an operation signal $m_a$ (see FIG. 5) which will be produced from an RS-flip flop 149, as described later. The high level signal i from RS-flip flop 141 disappears under control of an OR-gate 141f responsive to the reset signal $g_i$ from timing signal generator 130 or a reset signal from a power-on reset circuit 144. The power-on reset circuit 144 includes a time-constant circuit 144a which is responsive to a DC voltage $V_B$ from a vehicle battery to produce a high level signal with a width defined by a predetermined time-constant of circuit 144a. The reset circuit 144 also includes a NAND-gate 144b wherein the high level signal from time-constant circuit 144a is waveformed by schmidt-trigger function of NAND-gate 144b into the reset signal described above.

In the control signal generator 140, D-flip flops 142a, 142b, 142c are provided respectively to be reset in response to the reset signal from power-on reset circuit 144. D-flip flop 142a is responsive to the high level and preset signals i and $f_i$ respectively from RS-flip flop 141 and timing signal generator 130 after its reset condition to produce a command-speed set signal j (see FIG. 5) at its output terminal Q. The command-speed set signal j from D-flip flop 142a disappears in response to the preset signal $f_i$ from timing signal generator 130 after disappearance of the high level signal i from RS-flip flop 141. After reset by the reset signal from reset circuit 144, D-flip flop 142b is responsive to the command-speed set and latch signals j and $d_i$ respectively from D-flip flop 142a and timing signal generator 130 to produce a high level signal k (see FIG. 5) at its output terminal Q. The high level signal k from D-flip flop 142b drops to a low level in response to the latch signal $d_i$ from timing signal generator 130 after disappearance of the command-speed set signal j. D-flip flop 142c produces a high level signal upon receiving the high level and latch signals k and $d_i$ respectively from D-flip flop 142b and timing signal generator 130 after its reset condition. The high level signal from D-flip flop 142c drops to a low level in response to the latch signal $d_i$ from timing signal generator 130 after disappearance of the high level signal k.

An RS-flip flop 147 is provided to produce a high level signal at its output terminal Q upon receipt of the command-speed set signal j from D-flip flop 142a after reset by an OR-gate 147a responsive to the reset signal from reset circuit 144. The high level signal from RS-flip flop 147 disappears under control of OR-gate 147a responsive to a release signal $r_1$ which will be produced from the cancellation circuit 150, as described later. A frequency divider 148c is in the form of the above-noted CD 4520 type binary counter which is connected to the clock circuit 110 and connected through an OR-gate 148b to the wave shaper 148a and cancellation circuit 150. Under control of OR-gate 148b responsive to the reshaped signal from wave shaper 148a or disappearance of the release signal $r_2$ from cancellation circuit 150, the frequency divider 148c counts a series of the clock signals $C_3$ from clock circuit 110 to produce a high level or resume signal indicative of the counted number 4 of the clock signals $C_3$ at its output terminal $Q_3$. This means that the frequency divider 148c acts as a digital low pass filter of substantially 250 Hz in relation to the electric signal P from resume switch 70.

After set by an OR-gate 149b responsive to the reset signal from reset circuit 144, an RS-flip flop 149 is reset by an OR-gate 149a responsive to the command-speed set signal j from D-flip flop 142a to produce a low level signal at its output terminal Q as the operation signal $m_a$ described above. The operation signal $m_a$ also appears from RS-flip flop 149 under control of an AND-gate 148 responsive to the high level and resume signals respectively from RS-flip flop 147 and frequency divider 148c. The operation signal $m_a$ from RS-flip flop 149 disappears under control of OR-gates 149b, 145b responsive to one of the reshaped signal $h_0$ from wave shaper 145a and the release signal $r_1$ from the cancellation circuit 150. An RS-flip flop 143 is responsive to the command-speed set signal j from D-flip flop 142a to inhibit generation of an operation signal $m_b$ at its output terminal Q (see FIG. 5). Upon receipt of the high level signal from D-flip flop 142c, RS-flip flop 143 acts to generate a high level signal as the operation signal $m_b$.

An inverter 146b serves to invert the reshaped signal from wave shaper 146a into an acceleration signal n.

In summary, the control signal generator 140 is responsive to the electric signal c from set switch 40 and a series of the clock signals $C_3$ from clock circuit 110 to generate a set signal $c_0$ and responsive to the preset signal $f_i$ from timing signal generator 130 after generation of the set signal $c_0$ to produce a command-speed set signal j. The command-speed set signal j disappears in response to the preset signal $f_i$ from timing signal generator 130 immediately after generation of the set signal $c_0$. The control signal generator 140 is responsive to one of the command-speed set signal j and the electric signal p from resume switch 70 to produce an operation signal $m_a$ which disappears in response to one of the release signal h from cancel switch 50 and the release signal $r_1$ from cancellation circuit 150. The control signal generator 140 is responsive to the electric signal from acceleration switch 60 to produce an acceleration signal n and generates an operation signal $m_b$ in response to the latch signal $d_i$ from timing signal generator 130 immediately after disappearance of the command-speed set signal j.

Figure 6:
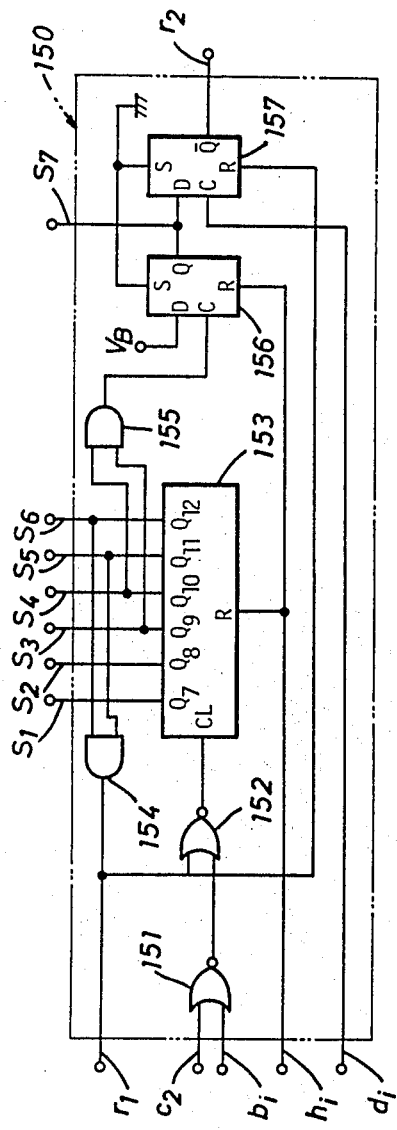
FIG. 6 is a circuit diagram of an embodiment of the cancellation circuit shown in block form in FIG. 1.

The cancellation circuit 150 is provided with a binary counter 153 connected through NOR-gates 151, 152 to the clock circuit 110 and timing signal generator 130, as shown in FIGS. 1, 6 and also with an AND-gate 154 connected to the binary counter 153. The binary counter 153 is of the CD 4020 type manufactured by RCA and resets by the reset signal $h_i$ from timing signal generator 130 to count a series of the clock signals $C_2$ issued through NOR-gates 151, 152 from the clock circuit 110 substantially within the period of time $T_i$ of gate signal $b_i$ during disappearance of the release signal $r_1$ from AND-gate 154. Then, the counter 153 acts to produce high level or shift command signals $s_1$ to $s_6$ respectively at its output terminals $Q_7$ to $Q_{12}$ in dependence upon the counted number of the clock signals $C_2$. In case the counted number of the clock signals $C_2$ is not less than 3702, the counter 153 produces shift command signals $s_5$, $s_6$ respectively at its output terminals $Q_{11}$, $Q_{12}$. In case the counted number of the clock signals $C_2$ increases in a range of not less than 1536 and under 3072, the counter 153 produces a shift command signal $s_3$ at its output terminal $Q_9$ and thereafter produces shift command signals $s_4$, $s_5$ simultaneously at its output terminals $Q_{10}$, $Q_{11}$. In case the counted number of the clock signals $C_2$ increases in a range of not less than 1024 and under 1526, the counter 153 produces shift command signals $s_3$, $s_4$, $s_5$ at its output terminals $Q_9$, $Q_{10}$, $Q_{11}$ in sequence. In case the counted number of the clock signals $C_2$ is not less than 768 and under 1024, the counter 153 acts to produce shift command signals $s_3$, $s_4$ simultaneously at its output terminals $Q_9$, $Q_{10}$. These shift command signals $s_3$, $s_4$ respectively from the output terminals $Q_9$, $Q_{10}$ of counter 153 simultaneously disappear when the counted number of the clock signals $C_2$ is under 768. In the embodiment, the counted number of not less than 3072 corresponds to the vehicle speed of under 29.4 Km/h, the counted number of not less than 1536 corresponds to the vehicle speed of under 58.9 Km/h, the counted number of not less than 1024 corresponds to the vehicle speed of under 88.3 Km/h, and the counted number of not less than 768 corresponds to the vehicle speed of under 117.7 Km/h.

AND-gate 154 is responsive to the shift command signals $s_5$, $s_6$ from counter 153 to generate a high level signal as the above-noted release signal $r_1$ which disappears upon disappearance of one of the shift command signals $s_5$, $s_6$. This means that the release signal $r_1$ from AND-gate 154 appears at the vehicle speed of under 29.4 Km/h and disappears at the vehicle speed of more than 29.4 Km/h. A D-flip flop 156 is reset by the reset signal $h_i$ from timing signal generator 130 to produce a high level or shift command signal $s_7$ under control of AND-gate 155 responsive to the shift command signals $s_3$, $s_4$ from counter 153. This means that the shift command signal $s_7$ appears from D-flip flop 156 at the vehicle speed of under 117.7 Km/h and disappears at the vehicle speed of more than 117.7 Km/h. A D-flip flop 157 is responsive to the release signal $r_1$ from AND-gate 154 to produce a high level signal as the above-noted release signal $r_2$ described above. The release signal $r_2$ also appears from D-flip flop 157 in response to the latch signal $d_i$ from timing signal generator 130 during disappearance of the shift command signal $s_7$ from D-flip flop 156. During appearance of the shift command signal $s_7$ from D-flip flop 156, the release signal $r_2$ from D-flip flop 157 disappears in response to the latch signal $d_i$. This means that the release signal $r_2$ appears from D-flip flop 157 at the vehicle speed of under 29.4 Km/h or more than 117.7 Km/h and disappears at the vehicle speed of more than 29.4 Km/h and under 117.7 Km/h.

Figure 7:
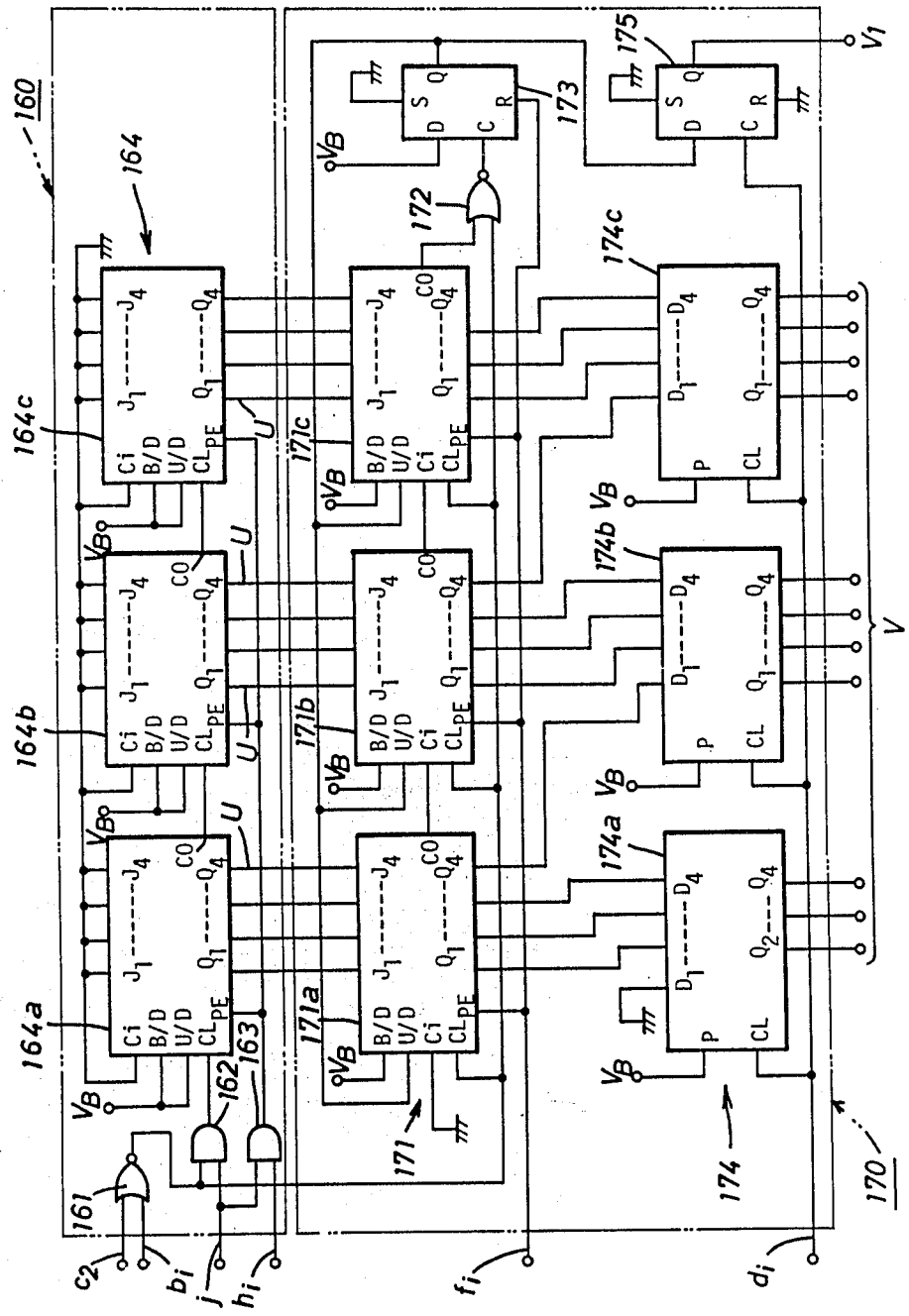
FIG. 7 is circuit diagrams of embodiments of the command-speed set circuit and speed-difference calculation circuit respectively shown in block form in FIG. 1.

The electronic control circuit EC includes a command-speed set circuit 160 connected to the clock circuit 110, timing signal generator 130 and control signal generator 140, and a speed-difference calculation circuit 170 connected to the timing signal generator 130 and command-speed set circuit 160, as shown in FIGS. 1, 7. The command-speed set circuit 160 includes a counter circuit 164 which is controlled by a NOR-gate 161 and AND-gates 162, 163. The counter circuit 164 is formed by presettable up-down counters 164a, 164b, 164c to function as a twelve-bit up counter circuit, as shown in FIG. 7. Each of the up-down counters 164a to 164c is of the CD 4029 type which is manufactured by RCA. The counter circuit 164 is reset by AND-gate 163 responsive to the reset and command-speed set signal $h_i$ and j respectively from timing and control signal generators 130 and 140 to count up a series of the clock signals $C_2$ issued through NOR-gate 161 and AND-gate 162 from clock circuit 110 within the period of time $T_i$ of gate signal $b_i$ during generation of the command-speed set signal j. Upon completing the count up operation, the counter circuit 164 acts to memorize therein the counted resultant value as a twelve-bit binary coded signal u indicative of the period of time $T_i$ of gate signal $b_i$. This means that the binary coded signal u is defined by the desired or command-speed of the vehicle upon closure of set switch 40. Additionally, the count up operation of counter circuit 164 is stopped by AND-gate 162 responsive to disappearance of the command-speed set signal j.

The speed-difference calculation circuit 170 includes a counter circuit 171 which is formed by presettable up-down counters 171a, 171b, 171c to function as a twelve-bit up-down counter circuit, as shown in FIG. 7. Each of the up-down counters 171a, 171b, 171c is of the CD 4029 type which is manufactured by RCA. The counter circuit 171 presets therein the binary coded signal u from counter circuit 164 in response to the preset signal $f_i$ from timing signal generator 130 to count down the value of the same signal u in accordance with a sereis of the clock signals $C_2$ issued through NOR-gate 161 from clock circuit 110 within the period of time $T_i$ of gate signal $b_i$ during generation of a low level signal which will be issued from a D-flip flop 173, as described below. During this count down operation, the counter circuit 171 serves to produce a high level signal at a carry-out terminal CO of up-down counter 171c.

In case the value of binary coded signal u is longer than a total period of time of a series of the clock signals $C_2$ issued through NOR-gate 161 from clock circuit 110 within the period of time $T_i$ of gate signal $b_i$, the counter circuit 171 completes the count down operation thereof during generation of the low level signal from D-flip flop 173 to produce an eleven-bit binary coded signal indicating an absolute value of a time difference between the value of binary coded signal u and the total period of time of the above-noted clock signals $C_2$ through NOR-gate 161, the time difference having a positive sign defined by the low level signal from D-flip flop 173. In case the value of binary coded signal u is shorter than the total period of time of a series of the above-noted clock signals $C_2$ through NOR-gate 161, the counter circuit 171 drops the high level signal from the carry-out terminal CO of counter 171c to a low level upon completion of the count down operation thereof and counts up the remainder of the above-noted clock signals $C_2$ through NOR-gate 161 in response to a high level signal which will be issued from D-flip flop 173. Upon completing the count up operation, the counter circuit 171 serves to produce an eleven-bit binary coded signal indicating an absolute value of another time difference between the value of binary coded signal u and the total period of time of the above-noted clock signals $C_2$ through NOR-gate 161, another time difference having a negative sign defined by the high level signal from D-flip flop 173.

D-flip flop 173 is reset in response to the preset signal $f_i$ from timing signal generator 130 to produce the above-noted low level signal at its output terminal Q. D-flip flop 173 also serves to procude the above-noted high level signal at its output terminal Q upon receiving the DC voltage $V_B$ from the vehicle battery under control of a NOR-gate 172 responsive to drop of one of the above-noted clock signals $C_2$ through NOR-gate 161 to a low level immediately after generation of the low level signal from the carry-out terminal CO of counter 171c. A latch circuit 174 is composed of latches 174a, 174b, 174c and is responsive to the latch signal $d_l$ from timing signal generator 130 to latch therein the binary coded signal from counter circuit 171 so as to produce the same signal as an eleven-bit difference signal v. A D-flip flop 175 acts to produce a low level signal at its output terminal Q in response to the latch signal $d_l$ and the low level signal from D-flip flop 173. D-flip flop 175 also produces a high level signal in response to the latch signal $d_l$ and the high level signal from D-flip flop 173. In other words, the high level signal from D-flip flop 173 is produced from D-flip flop 175 as a sign signal $v_1$ with the high level or negative sign in response to the latch signal $d_l$, and the low level signal from D-flip flop 173 is also produced from D-flip flop 175 as a sign signal $v_1$ with the low level or positive sign in response to the latch signal $d_l$.

In summary, it will be understood that the speed-difference calculation circuit 170 is responsive to the preset signal $f_i$ from timing signal generator 130 to calculate a time difference between the value of the binary coded signal u from command-speed set circuit 160 and a total period of time of a series of the clock signals $C_2$ issued from clock circuit 110 within the period of time $T_i$ of gate signal $b_i$ and also responsive to the latch signal $d_l$ from timing signal generator 130 to produce a difference signal v indicative of the calculated time difference and a sign signal $v_1$ indicative of a positive or negative sign of the calculated time difference.

From the above description, it will be clearly recognized that a vehicle speed $V_s$ satisfies the following equation (1) in relation to the period of time Ti of gate signal $b_i$ from timing signal generator 130.

$$Ti = \beta/V_s \ldots (1)$$

where the character $\beta$ indicates a constant. Assuming that the vehicle command-speed upon closure of the set switch 40 is $V_{so}$ and that the actual vehicle speed is $(V_{so} - \Delta V_s)$, a time difference $\Delta T$ is represented by the following equation (2).

$$T = \beta \left( \frac{1}{V_{so} - \Delta V_s} - \frac{1}{V_{so}} \right) \quad (2)$$

$$= \frac{\beta \Delta V_s}{(V_{so} - \Delta V_s) V_{so}}$$

$$\approx \frac{\beta \Delta V_s}{V_{so}^2} \quad (\because V_{so}^2 >> \Delta V_s V_{so})$$

where the character $\Delta V_s$ indicates a difference between the vehicle command-speed $V_{so}$ and the actual vehicle speed. This means that the time difference $\Delta T$ is substantially proportional to the speed difference $\Delta V_s$. Consequently, it should be understood that the difference signal v from latch circuit 174 indicates the time difference $\Delta T$ corresponding with the speed difference $\Delta V_s$.

Figure 9:
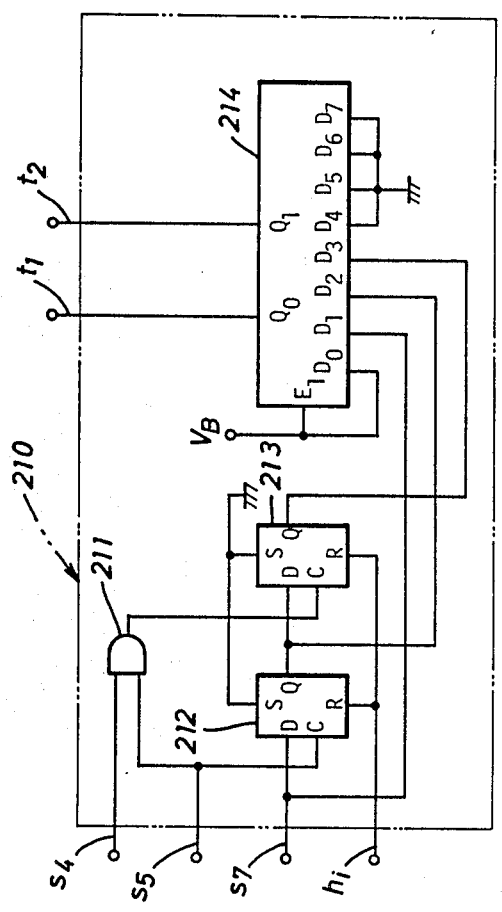
FIG. 9 is a circuit diagram of an embodiment of the shift control circuit shown in block form in FIG. 1.
Figure 8:
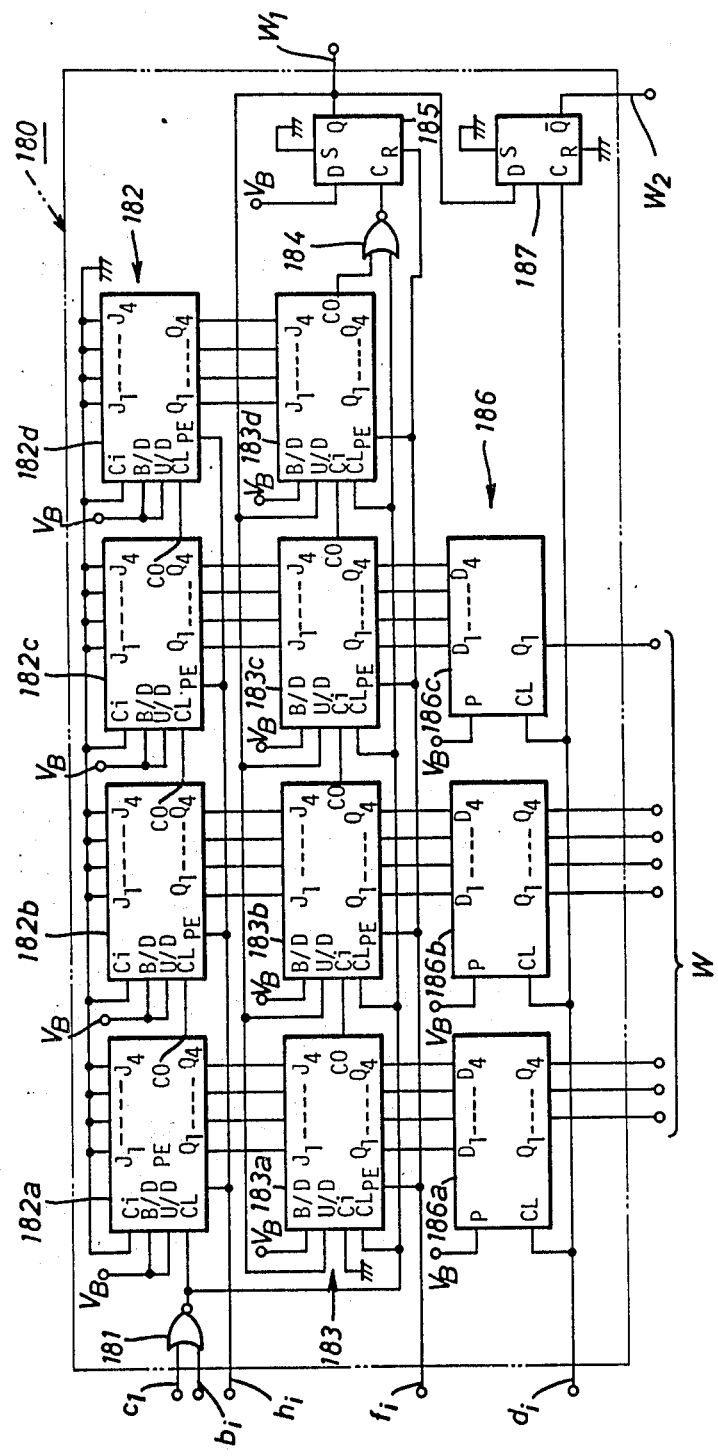
FIG. 8 is a circuit diagram of an embodiment of the acceleration calculation circuit shown in block form in FIG. 1.

The electronic control circuit EC includes an acceleration calculation circuit 180 connected to the clock circuit 110 and timing signal generator 130, and a shift control circuit 210 connected to the timing signal generator 130 and cancellation circuit 150, as shown in FIGS. 1, 8, 9. The acceleration calculation circuit 180 comprises a counter circuit 182 which is formed by presettable up-down counters 182a, 182b, 182c, 182d to function as a sixteen-bit up counter circuit, as shown in FIG. 8. Each of the up-down counters 182a to 182d is of the CD 4029 type which is manufactured by RCA. The counter circuit 182 is reset in response to the reset signal $h_l$ from timing signal generator 130 to count up a series of the clock signals $C_1$ issued through a NOR-gate 181 from clock circuit 110 within the period of time Ti of gate signal $b_i$. Upon completion of the count up operation, the counter circuit 182 acts to latch therein the counted resultant value as a sixteen-bit binary coded signal indicative of the period of time Ti of gate signal $b_i$ to be applied to a counter circuit 183.

The counter circuit 183 is formed by presettable up-down counters 183a, 183b, 183c, 183d to function as a sixteen-bit up-down counter circuit, as shown in FIG. 8. Each of the up-down counters 183a to 183d is of the CD 4029 type which is manufactured by RCA. The counter circuit 183 presets therein the binary coded signal from counter circuit 182 in response to the preset signal $f_i$ from timing signal generator 130 to count down the value of the same signal in accordance with a series of the clock signals $C_1$ through NOR-gate 181 from clock circuit 110 within the period of time Ti of gate signal $b_i$ during generation of a sign signal $w_1$ with a low level which will be issued from D-flip flop 185, as described later. During the count down operation, the counter circuit 183 acts to produce a high level signal at a carry-out terminal CO of counter 183d. In case the value of binary coded signal from counter circuit 182 is longer than a total period of time of a series of the clock signals $C_1$ from NOR-gate 181 within the period of time Ti of gate signal $b_i$, the counter circuit 183 completes the count down operation thereof during generation of the sign signal $w_1$ with low level from D-flip flop 185 to produce a twelve-bit binary coded signal indicating an absolute value of a time difference between the value of binary coded signal from counter circuit 182 and the total period of time of the above-noted clock signals $C_1$ from NOR-gate 181, the time difference having a positive sign defined by the sign signal $w_1$ with low level from D-flip flop 185. In case the value of binary coded signal from counter circuit 182 is shorter than the total period of time of the above-noted clock signals $C_1$ from NOR-gate 181, the counter circuit 183 drops the high level signal from the carry-out terminal CO of counter 183d to a low level upon completion of the count down operation thereof and counts up the remainder of a series of the above-noted clock signals $C_1$ in response to a sign signal $w_1$ with a high level which will be issued from D-flip flop 185. Upon completing the count up operation, the counter circuit 183 serves to produce a twelve-bit binary coded signal indicating an absolute value of another time difference between the value of binary coded signal from counter circuit 182 and the total period of time of the above-noted clock signals $C_1$ from NOR-gate 181, another time difference having a negative sign defined by the sign signal $w_1$ with high level from D-flip flop 185.

D-flip flop 185 is reset in response to the preset signal $f_i$ from timing signal generator 130 to produce the above-noted sign signal $w_1$ with low level at its output terminal Q. D-flip flop 185 also produces the above-noted sign signal $w_1$ with high level at its output terminal Q upon receiving the DC voltage $V_B$ from the vehicle battery under control of a NOR-gate 184 responsive to drop of one of a series of the clock signals $C_1$ from NOR-gate 181 immediately after generation of the low level signal from the carry-out terminal CO of counter 183d. A latch circuit 186 is composed of latches 186a, 186b, 186c and is responsive to the latch signal $d_i$ from timing signal generator 130 to latch therein the binary coded signal from counter circuit 183 so as to produce the same signal as an eight-bit difference signal w. A D-flip flop 187 acts to produce a sign signal $w_2$ with a high level at its output terminal $\overline{Q}$ in response to the latch signal $d_i$ and the sign signal $w_1$ with low level from D-flip flop 185. D-flip flop 187 also produces a sign signal $w_2$ with a low level in response to the latch signal $d_i$ and the sign signal $w_1$ with high level from D-flip flop 185. This means that the low level of sign signal $w_2$ from D-flip flop 187 corresponds to the negative sign and the high level of the sign signal $w_2$ corresponds to the positive sign.

In summary, the acceleration calculation circuit 180 is responsive to the preset and reset signals $f_i$ and $h_i$ from timing signal generator 130 to calculate a time difference between a total period of time of a series of the clock signal $C_1$ defined by the period of time $T_i$ of gate signal $b_i$ and another total period of time of a series of the clock signal $C_1$ defined by a period of time $T_{i+1}$ of a gate signal $b_{i+1}$ following the above gate signal $b_i$ so as to produce a difference signal w indicative of an absolute value of the calculated time difference. The acceleration calculation circuit 180 produces a sign signal $w_1$ with one of low and high levels respectively corresponding to the positive and negative signs of the calculated time difference upon completing its calculation. The calculation circuit 180 is also responsive to the sign signal $w_1$ with low level to produce a sign signal $w_2$ with a high level or the positive sign of the calculated time difference and is responsive to the sign signal $w_1$ with high level to produce a sign signal $w_2$ with a low level or the negative sign of the calculated time difference.

As shown in FIGS. 1, 9, the shift control circuit 210 is provided with an AND-gate 211 connected to the cancellation circuit 150, with a D-flip flop 212 connected to the timing signal generator 130 and cancellation circuit 150 and also with a D-flip flop 213 connected to the timing signal generator 130, AND-gate 211 and D-flip flop 212. AND-gate 211 is responsive to the shift command signals $s_4$, $s_5$ from cancellation circuit 150 to produce a high level signal. The high level signal from AND-gate 211 drops to a low level in response to disappearance of one of the shift command signals $s_4$, $s_5$. D-flip flop 212 is responsive to the shift command signals $s_5$, $s_7$ from cancellation circuit 150 after reset by the reset signal $h_i$ from timing signal generator 130 to generate a high level signal at its output terminal Q. D-flip flop 212 also generates a low level signal at its output terminal Q in response to the shift command signal $s_5$ during disappearance of the shift command signal $s_7$. After reset by the reset signal $h_i$ from timing signal generator 130, D-flip flop 213 acts to generate a high level signal at its output terminal Q in response to the high level signals respectively from AND-gate 211 and D-flip flop 212. D-flip flop 213 also generates a low level signal at its output terminal Q in response to the high and low level signals respectively from AND-gate 211 and D-flip flop 212.

In other words, at the vehicle speed of under 58.9 Km/h, D-flip flop 212 generates a high level signal upon successively receiving the shift command signal $s_7$ and shift command signal $s_5$ during generation of the shift command signal $s_7$ given by increase of the counted number of cancellation circuit 150, and thereafter D-flip flop 213 generates a high level signal in response to the high level signal from D-flip flop 212 under control of AND-gate 211 responsive to the shift command signal $s_5$ and shift command signal $s_4$ during generation of the shift command signal $s_5$ given by the increase of the counted number of cancellation circuit 150. At the vehicle speed of not less than 58.9 Km/h and under 88.3 Km/h, D-flip flop 212 generates a high level signal upon successively receiving the shift command signal $s_7$ and shift command signal $s_5$ during generation of the shift command signal $s_7$ given by the increase of the counted number of cancellation circuit 150, whereas D-flip flop 213 generates a low level signal under control of AND-gate 211 responsive to disappearance of the shift command signal $s_4$ given by the increase of the counted number of cancellation circuit 150. At the vehicle speed of not less than 88.3 Km/h and under 117.7 Km/h, D-flip flops 212, 213 generate respectively a low level signal in response to successive generation of the shift command signals $s_7$, $s_4$ during disappearance of the shift command signal $s_5$ given by the increase of the counted number of cancellation circuit 150. Furthermore, at the vehicle speed of not less than 117.7 Km/h, D-flip flops 212, 213 generate respectively a low level signal because of disappearance of each of the shift command signals $s_7$, $s_4$, $s_5$ from cancellation circuit 150.

The shift control circuit 210 is also provided with an encoder 214 of the TC 4532 type which is manufactured by TOKYO SHIBAURA DENKI KABUSHIKI KAISHA in Japan and connected to the cancellation circuit 150 and D-flip flops 212, 213. The encoder 214 acts to generate high or shift control signals $t_1$, $t_2$ simultaneously at its output terminals $Q_0$, $Q_1$ upon sequentially receiving the shift command signal $s_7$ from cancellarion circuit 150 at its input terminal $D_1$ and the high level signals from D-flip flops 212, 213 respectively at its input terminals $D_2$, $D_3$. When the encoder 214 receives the shift command signal $s_7$ from cancellation circuit 150 and the high level signal from D-flip flop 212 successively at its input terminals $D_1$ and $D_2$ during generation of the low level signal from D-flip flop 213, it drops the shift control signal $t_1$ to a low level and generates the shift control signal $t_2$. During generation of each of the low level signals respectively from D-flip flops 212, 213, the encoder 214 is responsive to the shift command signal $s_7$ to generate the shift control signal $t_1$ and to drop the shift control signal $t_2$ to a low level. When the shift command signal $s_7$ and the high level signals respectively from D-flip flops 212, 213 is respectively at a low level, the shift control signals $t_1$, $t_2$ from encoder 214 is respectively at a low level. Additionally, the encoder 214 is provided with input terminals $E_1$, $D_0$ for receiving the DC voltage $V_B$ from the vehicle battery and also with input terminals $D_4$ to $D_7$ grounded.

As understood from the above description, the relationship between the level of each of the shift control signals $t_1$, $t_2$ and the vehicle speed is summarized as follows.

| Vehicle speed | $t_1$ | $t_2$ |
|---|---|---|
| under 58.9 Km/h | high level | high level |
| 58.9–88.3 Km/h | low level | high level |
| 88.3–117.7 Km/h | high level | low level |
| not less than 117.7 Km/h | low level | low level |

Figure 10:
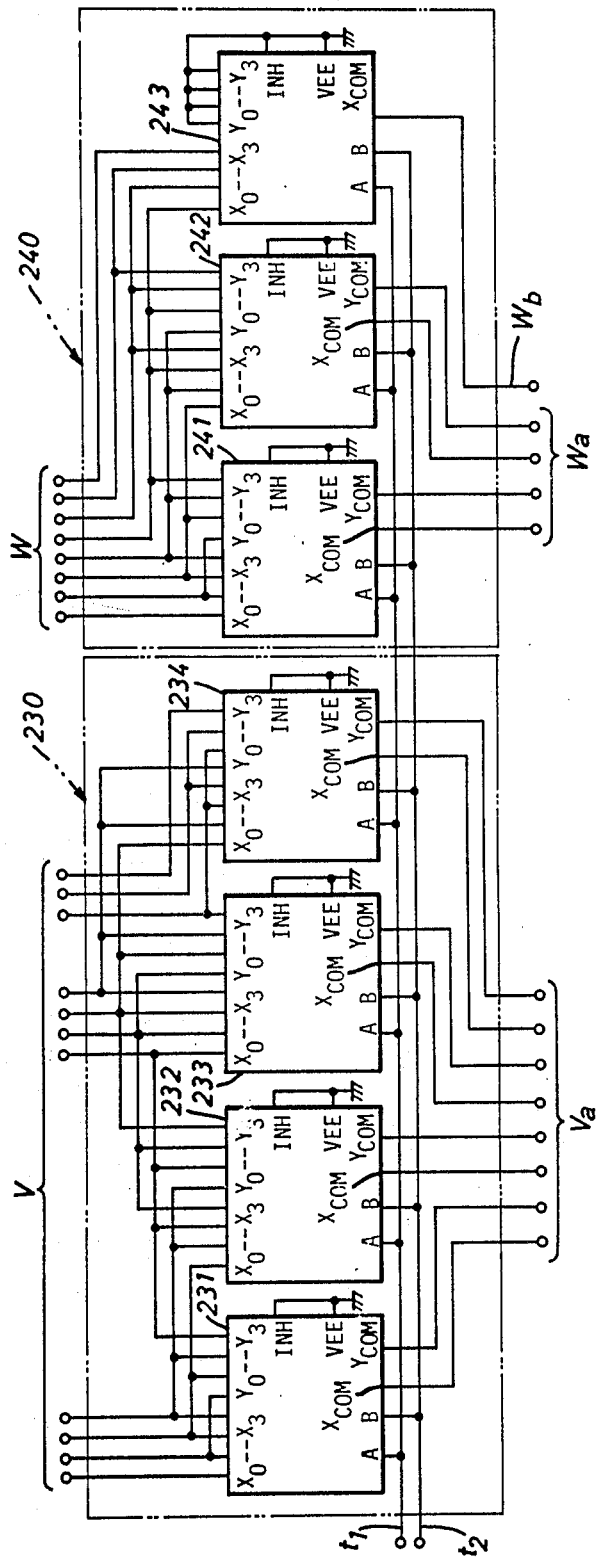
FIG. 10 is circuit diagrams of embodiments of the speed-difference and acceleration output shifters respectively shown in block form in FIG. 1.

The electronic control circuit EC includes a speed-difference output shifter 230 connected to the speed-difference calculation and shift control circuits 170, 210 and an acceleration output shifter 240 connected to the acceleration calculation and shift control circuits 180, 210, as shown in FIGS. 1, 10. The speed-difference output shifter 230 comprises analog multiplexers 231 to 234 which are respectively of the CD 4052 type manufactured by RCA. The analog multiplexer 231 is provided with input terminals $x_0$, $x_1$, $x_2$, $x_3$ respectively connected to the output terminals $Q_2$, $Q_3$, $Q_4$ of latch 174a and output terminal $Q_1$ of latch 174b and also provided with input terminals $Y_0$, $Y_1$, $Y_2$, $Y_3$ respectively connected to the output terminals $Q_3$, $Q_4$ of latch 174a and output terminals $Q_1$, $Q_2$ of latch 174b. The analog multiplexer 232 is provided with input terminals $x_0$, $x_1$, $x_2$, $x_3$ respectively connected to the output terminal $Q_4$ of latch 174a and output terminals $Q_1$, $Q_2$, $Q_3$ of latch 174b and also provided with input terminals $Y_0$, $Y_1$, $Y_2$, $Y_3$ respectively connected to the output terminals $Q_1$, $Q_2$, $Q_3$, $Q_4$ of latch 174b. The analog multiplexer 233 is provided with input terminals $x_0$, $x_1$, $x_2$, $x_3$ respectively connected to the output terminals $Q_2$, $Q_3$, $Q_4$ of latch 174b and output terminal $Q_1$ of latch 174c and also provided with input terminals $Y_0$, $Y_1$, $Y_2$, $Y_3$ respectively connected to the output terminals $Q_3$, $Q_4$ of latch 174b and output terminals $Q_1$, $Q_2$ of latch 174c. The analog multiplexer 234 is provided with input terminals $X_0$, $X_1$, $X_2$, $X_3$ respectively connected to the output terminal $Q_4$ of latch 174b and output terminals $Q_1$, $Q_2$, $Q_3$ of latch 174c and also provided with input terminals $Y_0$, $Y_1$, $Y_2$, $Y_3$ respectively connected to the output terminals $Q_1$, $Q_2$, $Q_3$, $Q_4$ of latch 174c.

When the output shifter 230 receives the shift control signals $t_1$, $t_2$ from shift control circuit 210 respectively at control terminals A, B of each of multiplexers 231 to 234 also the difference signal v from latch circuit 174 at the input terminals $X_0$ to $X_3$ and $Y_0$ to $Y_3$ of each of multiplexers 231 to 234, it provides connections between the input and output terminals $X_3$ and $X_{COM}$ of each of multiplexers 231 to 234 and between the input and output terminals $Y_3$ and $Y_{COM}$ of each of multiplexers 231 to 234 to produce output signals respectively from the output terminals $Q_1$ to $Q_4$ of each of the latches 174b, 174c as an eight-bit binary coded signal $v_a$ at the output terminals $X_{COM}$, $Y_{COM}$ of each of multiplexers 231 to 234. This means that at the vehicle speed of under 58.9 Km/h, the binary coded signal $v_a$ is defined by the first to eighth high-order digits of the value of binary coded signal v from calculation circuit 170. Upon receiving the shift control signal $t_2$ from shift control circuit 210 at the control terminal B of each of multiplexers 231 to 234 under the low level of the shift control signal $t_1$, the output shifter 230 provides connections between the input and output terminals $X_2$ and $x_{COM}$ of each of multiplexers 231 to 234 and between the input and output terminals $Y_2$ and $Y_{COM}$ of each of multiplexers 231 to 234 to produce output signals respectively from the output terminal $Q_4$ of latch 174a, output terminals $Q_1$ to $Q_4$ of latch 174b and output terminals $Q_1$ to $Q_3$ of latch 174c as the eight-bit binary coded signal $v_a$ at the output terminals $x_{COM}$, $Y_{COM}$ of each of multiplexers 231 to 234. This means that at the vehicle speed of not less than 58.9 Km/h and under 88.3 Km/h, the binary coded signal $v_a$ is defined by the second to ninth high-order digits of the value of binary coded signal v.

Upon receiving the shift control signal $t_1$ from shift control circuit 210 at the control terminal A of each of multiplexers 231 to 234 under the low level of shift control signal $t_2$, the output shifter 230 provides connections between the input and output terminals $X_1$ and $x_{COM}$ of each of multiplexers 231 to 234 and between the input and output terminals $Y_1$ and $Y_{COM}$ of each of multiplexers 231 to 234 to produce output signals respectively from the output terminals $Q_3$, $Q_4$ of latch 174a, output terminals $Q_1$ to $Q_4$ of latch 174b and output terminals $Q_1$, $Q_2$ of latch 174c as the eight-bit binary coded signal $v_a$ at the output terminals $x_{COM}$, $Y_{COM}$ of each of multiplexers 231 to 234. This means that at the vehicle speed of not less than 88.3 Km/h and under 117.7 Km/h, the binary coded signal $v_a$ is defined by the third to tenth high-order digits of the value of binary coded signal v. When the shift command signals $t_1$, $t_2$ are respectively at the low level, the output shifter 230 provides connections between the input and output terminals $X_0$ and $x_{COM}$ of each of multiplexers 231 to 234 and between the input and output terminals $Y_0$, $Y_{COM}$ of each of multiplexers 231 to 234 to produce output signals respectively from the output terminals $Q_2$ to $Q_4$ of latch 174a, output terminals $Q_1$ to $Q_4$ of latch 174b and output terminal $Q_1$ of latch 174c as the binary coded signal $v_a$ at the output terminals $x_{COM}$, $Y_{COM}$ of each of multiplexers 231 to 234. This means that at the vehicle speed of 117.7 Km/h or more, the binary coded signal $v_a$ is defined by the fourth to eleventh high-order digits of the value of binary coded signal v.

From the above description, it will be understood that as a period of time corresponding to the vehicle speed becomes shorter, a series of eight digits to be selected by the output shifter 230 from the value of difference signal v as the binary coded signal $v_a$ are shifted under control of the shift control circuit 210 from the high-order to the low-order.

The acceleration output shifter 240 comprises analog multiplexers 241 to 243 which are respectively of the CD 4052 type manufactured by RCA. The analog multiplexer 241 is provided with input terminals $X_0$, $X_1$, $X_2$, $X_3$ respectively connected to the output terminals $Q_2$, $Q_3$, $Q_4$ of latch 186a and output terminal $Q_1$ of latch 186b and also provided with input terminals $Y_0$, $Y_1$, $Y_2$, $Y_3$ respectively connected to the output terminals $Q_3$, $Q_4$ of latch 186a and output terminals $Q_1$, $Q_2$ of latch 186b. The analog multiplexer 242 is provided with input terminals $X_0$, $X_1$, $X_2$, $X_3$ respectively connected to the output terminal $Q_4$ of latch 186a and output terminals $Q_1$, $Q_2$, $Q_3$ of latch 186b and also provided with input terminals $Y_0$, $Y_1$, $Y_2$, $Y_3$ respectively connected to the output terminals $Q_1$, $Q_2$, $Q_3$, $Q_4$ of latch 186b. The analog multiplexer 243 is provided with input terminals $X_0$, $X_1$, $X_2$, $X_3$ respectively connected to the output terminals $Q_2$, $Q_3$, $Q_4$ of latch 186b and output terminal $Q_1$ of latch 186c and also provided with input terminals $Y_0$ to $Y_3$ grounded respectively.

When the output shifter 240 receives the shift control signals $t_1$, $t_2$ from shift control circuit 210 respectively at control terminals A, B of each of multiplexers 241 to 243 and also the difference signal w from latch circuit 186 at the input terminals of each of multiplexers 241 to 243, it provides connections between the input and output terminals $X_3$ and $x_{COM}$ of each of multiplexers 241 to 243 and between the input and output terminals $Y_3$ and $Y_{COM}$ of each of multiplexers 241, 242 to produce output signals respectively from the output terminals $Q_1$ to $Q_4$ of latch 186b as a four-bit binary coded signal $w_a$ at the output terminals $x_{COM}$, $Y_{COM}$ of each of multiplexers 241, 242 and to produce an output signal from the output terminal $Q_1$ of latch 186c as a binary signal $w_b$ at the output terminal $x_{COM}$ of multiplexer 243. This means that at the vehicle speed of under 58.9 Km/h, the binary signal $w_b$ is defined by the first high-order digit of the value of difference signal w and the binary coded signal $w_a$ is defined by the second to fifth high-order digits of the value of difference signal w.

Upon receiving the shift control signal $t_2$ from shift control circuit 210 at the control terminal B of each of multiplexers 241 to 243 under the low level of the shift control signal $t_1$, the output shifter 240 provides connections between the input and output terminals $X_2$ and $x_{COM}$ of each of multiplexers 241 to 243 and between the input and output terminals $Y_2$ and $Y_{COM}$ of each of multiplexers 241, 242 to produce output signals respectively from the output terminal $Q_4$ of latch 186a and output terminals $Q_1$ to $Q_3$ of latch 186b as the four-bit binary coded signal $w_a$ at the output terminals $x_{COM}$, $Y_{COM}$ of each of multiplexers 241, 242 and to produce an output signal from the output terminal $Q_4$ of latch 186b as the binary signal $w_b$ at the output terminal $x_{COM}$ of multiplexer 243. This means that at the vehicle speed of not less than 58.9 Km/h and under 88.3 Km/h, the binary signal $w_b$ is defined by the second high-order digit of the value of difference signal w and the binary coded signal $w_a$ is defined by the third to sixth high-order digits of the value of difference signal w.

Upon receiving the shift control signal $t_1$ from shift control circuit 210 at the control terminal A of each of multiplexers 241 to 243 under the low level of the shift control signal $t_2$, the output shifter 240 provides connections between the input and output terminals $X_1$ and $x_{COM}$ of each of multiplexers 241 to 243 and between the input and output terminals $Y_1$ and $Y_{COM}$ of each of multiplexers 241, 242 to produce output signals respectively from the output terminals $Q_3$, $Q_4$ of latch 186a and output terminals $Q_1$, $Q_2$ of latch 186b as the four-bit binary coded signal $w_a$ at the output terminals $x_{COM}$, $Y_{COM}$ of each of multiplexers 241, 242 and to produce an output signal from the output terminal $Q_3$ of latch 186b as the binary signal $w_b$ at the output terminal $x_{COM}$ of multiplexer 243. This means that at the vehicle speed of not less than 88.3 Km/h and under 117.7 Km/h, the binary signal $w_b$ is defined by the third high-order digit of the value of difference signal w and the binary coded signal $w_a$ is defined by the fourth to seventh high-order digits of the value of difference signal w.

When the shift command signals $t_1$, $t_2$ are respectively at the low level, the output shifter 240 provides connections between the input and output terminals $X_0$ and $X_{COM}$ of each of multiplexers 241 to 243 and between the input and output terminals $Y_0$ and $Y_{COM}$ of each of multiplexers 241, 242 to produce output signals respectively from the output terminals $Q_2$ to $Q_4$ of latch 186a and output terminal $Q_1$ of latch 186b as the four-bit binary coded signal $w_a$ at the output terminals $x_{COM}$, $Y_{COM}$ of each of multiplexers 241, 242 and to produce an output signal from the output terminal $Q_2$ of latch 186b as the binary signal $w_b$ at the output terminal $x_{COM}$ of multiplexer 243. This means that at the vehicle speed of not less than 117.7 Km/h, the binary signal $w_b$ is defined by the fourth high-order digit of the value of the difference signal w and the binary coded signal $w_a$ is defined by the fifth to eighth high-order digits of the value of the difference signal w.

From the above description, it will be understood that as the period of time corresponding to the vehicle speed becomes shorter, a series of five digits to be selected by the output shifter 240 from the value of difference signal w as the binary signal $w_b$ and binary coded signal $w_a$ are shifted under control of the shift control circuit 210 from the high-order to the low-order. In this case, the binary signal $w_b$ is defined by the highest significant digit of the selected five digits and the binary coded signal $w_a$ is defined by the remainder of the selected five digits.

Figure 11:
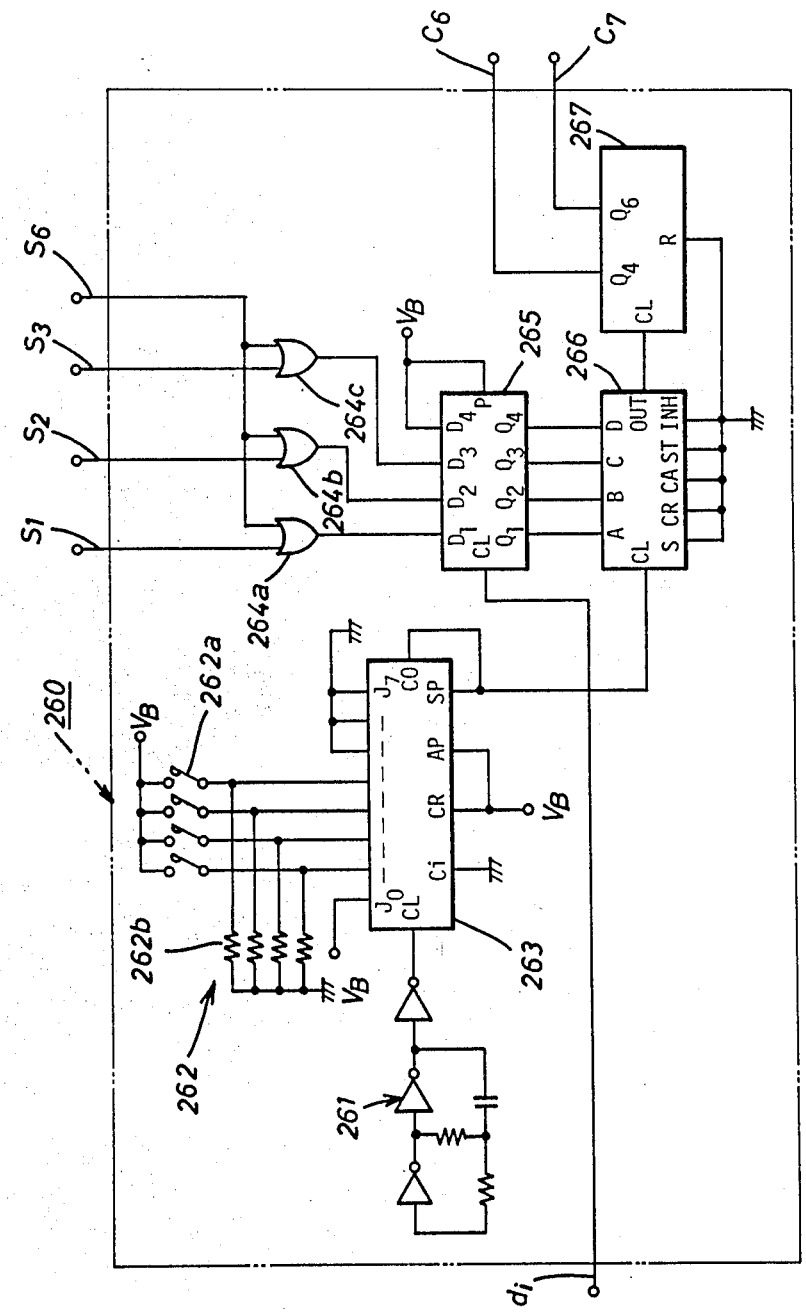
FIG. 11 is a circuit diagram of an embodiment of the clock signal generator shown in block form in FIG. 1.
Figure 12:
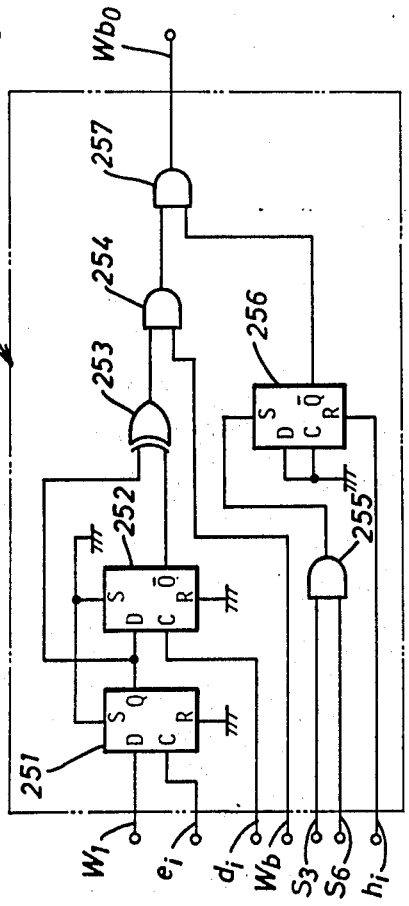
FIG. 12 is a circuit diagram of an embodiment of the digit signal generator shown in block form in FIG. 1.

The electronic control circuit EC comprises a variable clock signal generator 260 connected to the cancellation circuit 150 and a digit signal generator 250 connected to the timing signal generator 130, cancellation and acceleration calculation circuits 150, 180 and acceleration output shifter 240, as shown in FIGS. 1, 11 and 12. As shown in FIG. 11, the variable clock signal generator 260 is provided with as oscillator 261 for generating a series of oscillating signals respectively with a predetermined frequency and with a preset circuit 262 having a digital code switch 262a and a pull-down resistor circuit 262b. The digital code switch 262a has four manual switches each of which one terminal is connected to the vehicle battery. The other terminals of the manual switches of digital code switch 262a are grounded respectively through resistors of pull-down resistor circuit 262b. When the switches of digital code switch 262a are selectively closed, the preset circuit 262 acts to generate a four-bit binary coded signal defined by the selective closures of the switches of digital code switch 262a.

The variable clock signal generator 260 is also provided with a frequency divider 263 connected to the oscillator 261 and preset circuit 262 and with a latch 265 which is connected to the timing signal generator 130 and also connected through OR-gates 264a to 264c to the cancellation circuit 150 (see FIGS. 1, 11). The frequency divider 263 is a programmable down counter of the CD 40103 type which is manufactured by RCA and is previously programmed to divide the frequency of each of the oscillating signals from oscillator 261 by a divisional frequency ratio of $\frac{1}{2}(N+1)$, the reference charactor N indicating a value of the binary coded signal from preset circuit 262. When the down counter 263 presets the binary coded signal from preset circuit 262 at its jam-in terminals $J_1$ to $J_4$, it starts to count down the value N of the preset binary coded signal in response to a series of the oscillating signals from oscillator 261 so as to produce a high level signal at its carry-out terminal CO. Upon completing the count-down operation, the down counter 263 serves to produce a low level signal as a divisional frequency signal at its carry-out terminal CO. This means that the divisional frequency signal from down counter 263 has a frequency equal to $\frac{1}{2}(N+1)$ of the frequency of each of the oscillating signals from oscillator 261.

The latch 265 is of the CD 4042 type which is manufactured by RCA and provided with an input terminal $D_1$ connected through OR-gate 264a to the output terminals $Q_7$, $Q_{12}$ of binary counter 153 of cancellation circuit 150 and with an input terminal $D_2$ connected through OR-gate 264b to the output terminals $Q_8$, $Q_{12}$ of binary counter 153 (see FIGS. 6, 11). The latch 265 is also provided with an input terminal $D_3$ connected through OR-gate 264c to the output terminals $Q_9$, $Q_{12}$ of binary counter 153 and with an input terminal $D_4$ connected to the vehicle battery. When the latch 265 receives one of the shift command signals $s_1$, $s_6$ through OR-gate 264a from binary counter 153, one of the shift command signals $s_2$, $s_6$ through OR-gate 264b from counter 153, one of the shift command signals $s_3$, $s_6$ through OR-gate 264c from counter 153 and the DC voltage $V_B$ from the vehicle battery, it is responsive to the latch signal $d_l$ from timing signal generator 130 to latch therein the output signals from OR-gates 264a to 264c and the DC voltage $V_B$ as a four-bit binary coded signal.

In the clock signal generator 260, a rate-multiplier 266 is provided to multiply 1/16 of a value of the binary coded signal from latch 265 by a frequency of the divisional frequency signal from frequency divider 263 and to generate sequentially therefrom a pulse signal with a frequency defined by the multiplying resultant value. In the embodiment as the rate-multiplier 266, used is a CD 4089 type rate-multiplier which is manufactured by RCA. A frequency divider 267 is a binary counter of the CD 4024 type which is manufactured by RCA and counts a series of the pulse signals from rate-multiplier 266 to generate each series of clock signals $C_6$ and $C_7$ respectively at its output terminals $Q_4$ and $Q_6$. This means that a frequency of each of the clock signals $C_6$ is equal to 1/16 of the frequency of each of the pulse signals from rate-multiplier 266 and that a frequency of each of the clock signals $C_7$ is equal to 1/64 of the frequency of each of the pulse signals from rate-multiplier 266.

As shown in FIG. 12, the digit signal generator 250 is provided with a D-flip flop 251 connected to the timing signal generator 130 and acceleration calculation circuit 180 and with a D-flip flop 252 connected to the timing signal generator 130 and D-flip flop 251. D-flip flop 251 is responsive to the latch and sign signals $e_l$ and $w_1$ respectively from timing signal generator 130 and acceleration calculation circuit 180 to generate an output signal with the same level as that of the sign signal $w_1$ at its output terminal Q, whereas D-flip flop 252 is responsive to the latch signal $d_l$ from timing signal generator 130 and output signal from D-flip flop 251 to generate at its output terminal $\overline{Q}$ an output signal with a level opposite to that of the output signal from D-flip flop 251. In other words, when the sign signal $w_1$ is maintained at an identical level over both the periods of time Ti of a pair of gate signals $b_l$ appearing successively from timing signal generator 130, the output signals respectively from D-flip flops 251, 252 are maintained at the opposite levels to each other. This means that the output signal from D-flip flop 251 is maintained at the level opposite to that of the output signal from D-flip flop 252 during continuous acceleration or deceleration of the vehicle. When the level of sign signal $w_1$ changes over the periods of time Ti of the above-noted successive gate signals $b_i$, the output signals respectively from D-flip flops 251, 252 are maintained at a level identical to each other. This means that the output signal from D-flip flop 251 is maintained at the level identical to that of the output signal from D-flip flop 252 when the travel condition of the vehicle changes from acceleration to deceleration and vice versa.

The digit signal generator 250 is also provided with an exclusive OR-gate 253 connected to D-flip flops 251, 252 and with an AND-gate 254 connected to the acceleration output shifter 240 and exclusive OR-gate 253. AND-gate 254 acts to generate a high level signal upon receiving the binary signal $w_b$ from output shifter 240 under control of exclusive OR-gate 253 responsive to the output signals appearing respectively from D-flip flops 251, 252 at the opposite levels to each other. The high level signal from AND-gate 254 drops to a low level under control of exclusive OR-gate 253 responsive to the output signals respectively appearing from D-flip flops 251, 252 at the identical level to each other.

A D-flip flop 256 is connected to the timing signal generator 130 and also connected through an AND-gate 255 to the cancellation circuit 150. D-flip flop 256 is responsive to the reset signal $h_l$ from timing signal generator 130 to generate a high level signal at its output terminal $\overline{Q}$. The high level signal from D-flip flop 256 drops to a low level under control of AND-gate 255 responsive to the shift command signals $s_3$, $s_6$ from cancellation circuit 150. This means that D-flip flop 256 generates a high level signal at the vehicle speed of not less than 39.2 Km/h corresponding to the counted number of 2304 or less in the binary counter 153 of cancellation circuit 150 and also generates a low level signal at the vehicle speed of under 39.2 Km/h. An AND-gate 257 is responsive to the high level signals respectively from AND-gate 254 and D-flip flop 256 to produce a high level or digit signal $w_{bo}$. The digit signal $w_{bo}$ from AND-gate 257 drops to a low level in response to one of the low level signals respectively from AND-gate 254 and D-flip flop 256. This means that AND-gate 257 cooperates with AND-gate 254 to generate the binary signal $w_b$ as a digit signal $w_{bo}$ when the vehicle is continuously accelerated or decelerated at the speed of not less than 39.2 Km/h.

In summary, the digit signal generator 250 acts to discriminate as to the sign of sign signal $w_1$ from acceleration calculation circuit 180 in response to the latch signals $e_i$, $d_i$ successively appearing from the timing signal generator 130 over both the periods of time $T_i$ of a pair of successive gate signals $b_i$. When the discrimination result indicates that the sign of sign signal $w_1$ is maintained identical over both the above-noted periods of time $T_i$, the digit signal generator 250 generates the binary signal $w_b$ from acceleration output shifter 240 as a digit signal $w_{bo}$ in response to the reset signal $h_i$ from timing signal generator 130 during disappearance of each of the shift command signals $s_3$, $s_6$ from cancellation circuit 150. When the discrimination result indicates that the sign of sign signal $w_1$ changes over both the above-noted periods of time $T_i$, the digit signal $w_{bo}$ disappears from digit signal generator 250. The digit signal $w_{bo}$ also disappears from digit signal generator 250 in response to the shift command signals $s_3$, $s_6$ even if the sign of sign signal $w_1$ is maintained identical over both the above-noted periods of time $T_i$.

Figure 13:
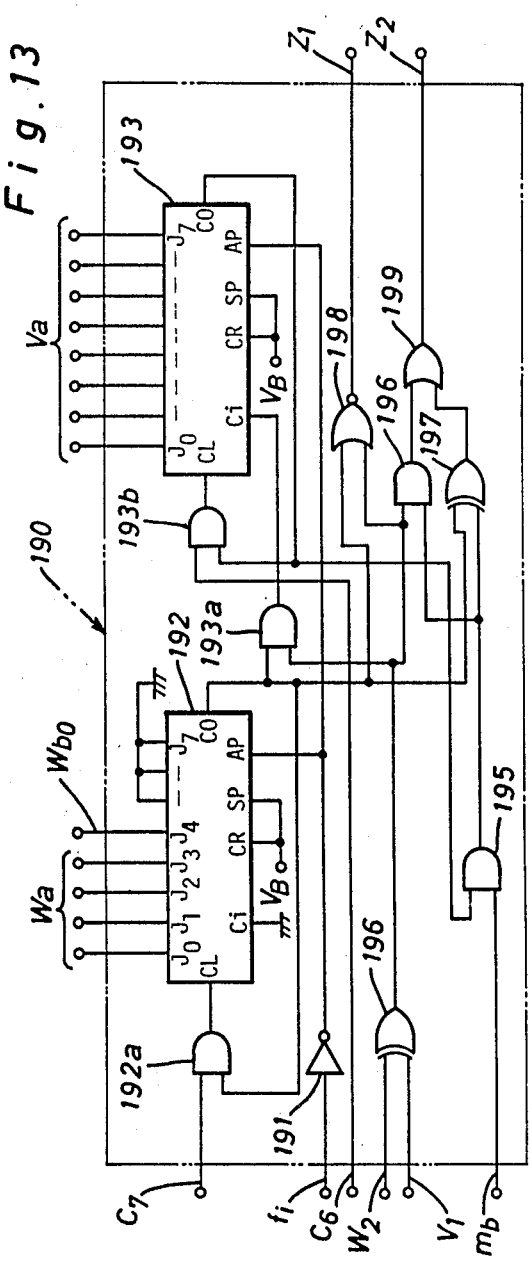
FIG. 13 is a circuit diagram of an embodiment of the correction signal generator shown in block form in FIG. 1.

In the electronic control circuit EC, a correction signal generator 190 is connected to the calculation circuits 170, 180, output shifters 230, 240 and signal generators 130, 140, 250, 260, as shown in FIGS. 1, 13. The correction signal generator 190 includes a pair of presettable down counters 192, 193 each of which is of the CD 40103 type manufactured by RCA. When the down counter 192 receives the binary coded signal $w_a$ from acceleration output shifter 240 at its jam-in terminals $J_0$ to $J_3$ and also receives the digit signal $w_{bo}$ from digit signal generator 250 at its jam-in terminal $J_4$, it presets therein the same signals $w_a$, $w_{bo}$ as a five-bit binary coded signal $w_{ba}$ upon receiving the preset signal $f_i$ through an inverter 191 from timing signal generator 130 at its synchronous preset-enable terminal AP. In this case, the highest significant digit of a value of the binary coded signal $w_{ba}$ is defined by the digit signal $w_{bo}$ and the remainder of the value of the binary coded signal $w_{ba}$ is defined by the binary coded signal $w_a$. Then, the counter 192 serves to generate a high level signal at its carry-out terminal CO such that it starts to count down the value of the binary coded signal $w_{ba}$ in accordance with a series of the clock signals $C_7$ through an AND-gate 192a from clock signal generator 260. Upon counting the value of binary coded signal $w_{ba}$ down to zero, the high level signal from the carry-out terminal CO of counter 192 drops to a low level to inhibit the count operation of counter 192 under control of AND-gate 192a. The above-noted operation in counter 192 is repeated in response to each preset signal $f_i$ from timing signal generator 130 such that a high level signal with a width corresponding to the value of binary coded signal $w_{ba}$ is repetitively produced from the carry-out terminal CO of counter 192. Additionally, the counter 192 is also provided with jam-in terminals $J_5$ to $J_7$ grounded respectively and with clear and synchronous preset-enable terminals CR and SP respectively for receiving the DC voltage $V_B$ from the vehicle battery.

The down counter 193 receives the binary coded signal $v_a$ from speed-difference output shifter 230 at its jam-in terminals $J_0$ to $J_7$ to preset therein the same signal $v_a$ upon receiving the preset signal $f_i$ through inverter 191 from timing signal generator 130 at its synchronous presetable terminal AP. When the counter 193 receives a high level signal from an AND-gate 193a at its carry-in terminal $c_i$, it is inhibited in its count down operation to produce a high level signal at its carry-out terminal CO. The high level signal from AND-gate 193a appears in response to the high level signal from down counter 192 and a high level signal which issues from an exclusive OR-gate 194 based on the identical signs or opposite levels of the sign signals $v_1$, $w_2$ respectively from calculation circuits 170, 180. Conversely, the high level signal from AND-gate 193a disappars in response to one of the low level signal from down counter 192 and a low level signal issuing from exclusive OR-gate 194 based on the opposite signs or identical levels of the sign signals $v_1$, $w_2$. Upon disappearance of the high level signal from AND-gate 193a, the counter 193 maintains generation of the high level signal therefrom and starts to count down a value of the binary coded signal $v_a$ in accordance with a series of the clock signals $c_6$ through an AND-gate 193b from clock signal generator 260. The count down operation of counter 193 is also initiated upon preset of the binary coded signal $v_a$ into the counter 193 during disappearance of the high level signal from AND-gate 193a. Upon counting the value of binary coded signal $v_a$ down to zero, the high level signal from counter 193 drops to a low level to inhibit the count down operation of counter 193 under control of AND-gate 193b. The above-noted operation in counter 193 is repeated in response to each preset signal $f_i$ from timing signal generator 130 such that a high level signal with a width corresponding to the value of binary coded signal $v_a$ or to a total of the values of binary coded signals $v_a$, $w_{ba}$ is repetitively produced from the carry-out terminal CO of counter 193.

The correction signal generator 190 also includes a NOR-gate 198 for generating a first correction signal $z_1$ with a low level in response to the high level signal from down counter 192 during generation of the low level signal from exclusive OR-gate 194. The first correction signal $z_1$ with low level also appears during generation of the high level signal from exclusive OR-gate 194 regardless of operation of down counter 192. Upon appearance of each of the low level signals respectively from down counter 192 and exclusive OR-gate 194, the first correction signal $z_1$ from NOR-gate 198 rises to a high level. This means that the first correction signal $z_1$ with low level has a width corresponding to the value of binary coded signal $w_{ba}$.

An AND-gate 195 is provided to produce a high level signal in response to the high level signal from down counter 193 during generation of the operation signal $m_b$ from control signal generator 140. The high level signal from AND-gate 195 drops to a low level when one of the operation signal $m_b$ and the high level signal from counter 193 drops to a low level. An AND-gate 196 serves to produce a high level signal in response to both of the high level signals from the exclusive OR-gate 194 and AND-gate 195. The high level signal from AND-gate 196 drops to a low level when one of the high level signals respectively from the exclusive OR-gate 194 and AND-gate 195 drops to a low level. An exclusive OR-gate 197 acts to produce a low level signal in response to the low or high level signals from the down counter 192 and AND-gate 195. The low level signal from exclusive OR-gate 197 rises to a high level in response to the opposite level signals from the down counter 192 and AND-gate 195. An OR-gate 199 is responsive to at least one of the high level signals from the exclusive OR-gate 197 and AND-gate 196 to produce a second correction signal $z_2$ with a high level. The second correction signal $z_2$ from OR-gate 199 drops to a low level in response to the low level signals from the exclusive OR-gate 197 and AND-gate 196.

In other words, while the operation signal $m_b$ from control signal generator 140 disappears, the second correction signal $z_2$ with high level appears from OR-gate 199 during the count down operation of counter 192 and drops to a low level upon completion of the count down operation of counter 192. This means that the second correction signal $z_2$ with high level has a width corresponding to the value of binary coded signal $w_{ba}$ regardless of function of the exclusive OR-gate 194. During appearance of the operation signal $m_b$ at the identical level of the sign signals $v_1$, $w_2$, the correction signal $z_2$ remains at a low level during the count down operation of each of counters 192, 193 and rises to a high level upon completion of the count down operation in one of counters 192, 193. This means that the correction signal $z_2$ has a width corresponding to an absolute value $|v_a - w_{ba}|$ of a difference between each value of binary coded signals $v_a$, $w_{ba}$. During appearance of the operation signal $m_b$ at the opposite levels of the sign signals $v_1$, $w_2$, the correction signal $z_2$ with high level appears during the count down operation of counter 192 and also appears during the count down operation of counter 193 caused by completion of the count down operation of counter 192, the correction signal $z_2$ dropping to a low level upon completion of the count down operation of counter 193. This means that the correction signal $z_2$ has a width corresponding to an absolute value $|v_a + w_{ba}|$ of a total value of binary coded signals $v_a$, $w_{ba}$.

Figure 14:
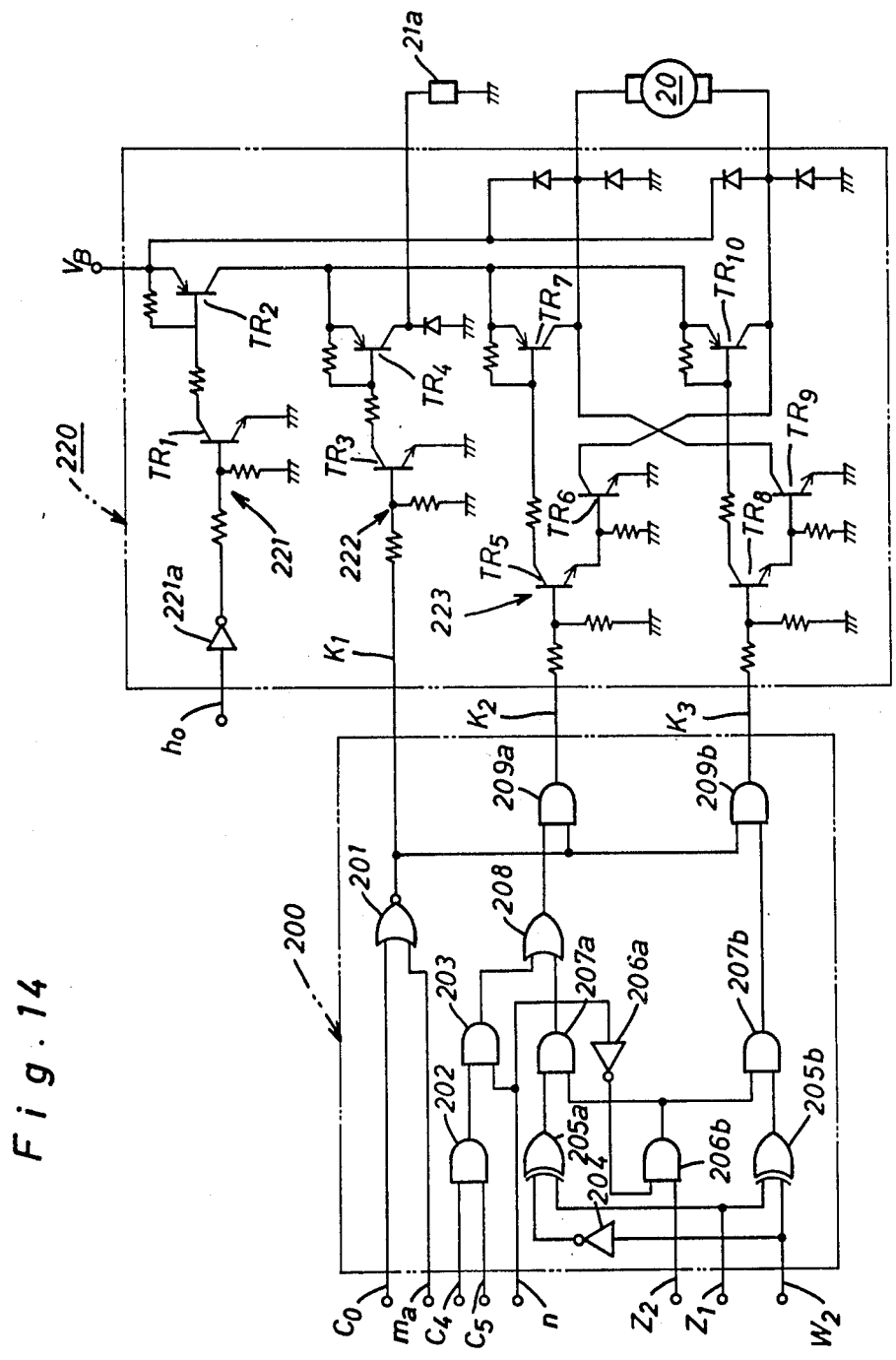
FIG. 14 is circuit diagrams of embodiments of the distribution and drive circuits respectively shown in block form in FIG. 1.

In the electronic control circuit EC, a distribution circuit 200 is connected to the control signal generator 140, acceleration calculation circuit 180 and correction signal generator 190, as shown in FIGS. 1, 14. The distribution circuit 200 comprises a NOR-gate 201 for generating a first distribution signal $K_1$ in response to disappearance of the set signal $c_0$ from the frequency divider 141c of control signal generator 140 (see FIG. 4) during generation of the operation signal $m_a$ from control signal generator 140 (see FIG. 10). The first distribution signal $K_1$ from NOR-gate 201 disappears in response to appearance of the set signal $c_0$ or disappearance of the operation signal $m_a$. An exclusive OR-gate 205a is provided to generate a low level signal upon receipt of the first correction signal $z_1$ from correction signal generator 190 under control of an inverter 204 responsive to the sign signal $w_2$ with the level opposite to that of the first correction signal $z_1$. The exclusive OR-gate 205a also generates a high level signal upon receipt of the first correction signal $z_1$ under control of the inverter 204 responsive to the sign signal $w_2$ with the level identical to that of the first correction signal $z_1$. This means that the inverter 204 and exclusive OR-gates 205a, 205b act a role necessary for deciding rotational direction of the reversible motor 20.

An AND-gate 206b serves to generate a high level signal in response to the second correction signal $z_2$ from correction signal generator 190 under control of an inverter 206a related to disappearance of the acceleration signal n from control signal generator 140. The high level signal from AND-gate 206b drops to a low level in response to the acceleration signal n. This means that AND-gate 206b permits supply of the second correction signal $z_2$ therethrough from correction signal generator 190 to AND-gates 207a, 207b during disappearance of the acceleration signal n and inhibits the above-noted supply of second correction signal $z_2$ upon generation of the acceleration signal n. An AND-gate 203 is provided to generate a series of pulse signals upon receiving the acceleration signal n from control signal generator 140 under control of an AND-gate 202 responsive to each series of the clock signals $C_4$, $C_5$ from clock circuit 110. In the embodiment, each of the pulse signals from AND-gate 203 has a predetermined frequency of 31.25 Hz corresponding to a duty ratio of ¼.

An AND-gate 209a is provided to generate a second distribution signal $K_2$ upon receiving a series of the pulse signals from AND-gate 203 through an OR-gate 208 during generation of the first distribution signal $K_1$ from NOR-gate 201. Generation of the second distribution signal $K_2$ from AND-gate 209a is also conducted under control of OR-gate 208 and AND-gate 207a responsive to the high level signals from exclusive OR-gate 205a and AND-gate 206b during generation of the first distribution signal $K_1$ from NOR-gate 201. The second distribution signal $K_2$ from AND-gate 209a disappears in response to disappearance of the first distribution signal $K_1$ or the pulse signals from AND-gate 203 and also disappears under control of OR-gate 208 and AND-gate 207a responsive to one of the low level signals from exclusive OR-gate 205a and AND-gate 206b. An AND-gate 209b is provided to generate a third distribution signal $K_3$ under control of AND-gate 207b responsive to the high level signals from exclusive OR-gate 205b and AND-gate 206b during generation of the first distribution signal $K_1$. The third distribution signal $K_3$ from AND-gate 209b disappears in response to disappearance of the first distribution signal $K_1$ and also disappears under control of AND-gate 207b responsive to one of the low level signals from exclusive OR-gate 205b and AND-gate 206b.

In summary, the distribution circuit 200 acts to generate a first distribution signal $K_1$ in response to the operation signal $m_a$ after disappearance of the set signal $c_0$. In case of generation of the operation signal $m_a$ during disappearance of each of set, operation and acceleration signals $c_0$, $m_b$ and n, the distribution circuit 200 acts to generate a second distribution signal $K_2$ in relation to the low or high level of each of the sign and correction signals $w_2$, $z_1$ and generates a third distribution signal $K_3$ in relation to the opposite levels of the sign and correction signals $w_2$, $z_1$. In this case, each of the distribution signals $K_2$, $K_3$ has a width corresponding to a width of the second correction signal $z_2$ defined by the binary coded signal $w_{ba}$. In case of generation of each of the operation signals $m_a$, $m_b$ during disappearance of each of the set and acceleration signals $c_0$, n, the distribution circuit 200 acts to generate a second distribution signal $K_2$ in relation to the high level of sign signal $v_1$ and the low level of each of the sign and correction signal $w_2$, $z_1$ and generates a third distribution signal $K_3$ in relation to the high level of sign signal $w_2$ and the low level of each of the sign and correction signals $v_1$, $z_1$. In this case, each of the distribution signals $K_2$, $K_3$ has a width corresponding to the width of second correction signal $z_2$ defined by the absolute value $|v_a + w_{ba}|$ of the total value of the binary coded signals $v_a$, $w_{ba}$.

In case of generation of each of the operation signals $m_a$, $m_b$ during disappearance of each of the set and acceleration signals $c_0$, n, the distribution circuit 200 serves to generate a second distribution signal $K_2$ in relation to the low level of each of the sign and correction signals $v_1$, $w_2$, $z_1$ when the value of binary coded signal $w_{ba}$ is longer than that of binary coded signal $v_a$. Generation of the second distribution signal $K_2$ is also conducted in relation to the high level of each of the sign and correction signals $v_1$, $w_2$, $z_1$ when the value of the binary coded signal $w_{ba}$ is shorter than that of the binary coded signal $v_a$. In this case, the second distribution signal $K_2$ has a width corresponding to the width of second correction signal $z_2$ defined by the absolute value $|v_a - w_{ba}|$ of the difference value between the binary coded signals $v_a$, $w_{ba}$.

In case of generation of each of the operation signals $m_a$, $m_b$ during disappearance of each of the set and acceleration signals $c_0$, n, the distribution circuit 200 serves to generate a third distribution signal $K_3$ in relation to the high level of the correction signal $z_1$ and the low level of each of the sign signals $v_1$, $w_2$ when the value of the binary coded signal $w_{ba}$ is shorter than that of the binary coded signal $v_a$. Generation of the third distribution signal $K_3$ is also conducted in relation to the low level of the correction signal $z_1$ and the high level of each of the sign signals $v_1$, $w_2$ when the value of binary coded signal $w_{ba}$ is longer than that of binary coded signal $v_a$. In this case, the third distribution signal $K_3$ has a width corresponding to the width of second correction signal $z_2$ defined by the absolute value $|v_a - w_{ba}|$ of the difference value between the binary coded signals $v_a$, $w_{ba}$. In addition, the distribution circuit 200 generates a series of pulse signals as the second distribution signal $K_2$ in response to the acceleration signal n and each series of the clock signals $C_4$, $C_5$ from clock circuit 110 during generation of the operation signal $m_a$ after disappearance of the set signal $c_0$.

A drive circuit 220 is provided with a first transistor circuit 221 connected to the cancel switch 50 and with second and third transistor circuits 222, 223 connected to the distribution circuit 200, as shown in FIGS. 1, 14. The first transistor circuit 221 includes a transistor $TR_1$ which is turned on under control of an inverter 221a based on release of the cancel switch 50 such that a transistor $TR_2$ is made conductive to supply the DC voltage $V_B$ from the vehicle battery to second and third transistor circuits 222 and 223. The transistor $TR_1$ is turned off under control of inverter 221a responsive to appearance of the release signal $h_0$ from the wave shaper 145a of control signal generator 140 such that the transistor $TR_2$ is made nonconductive to block the supply of DC voltage $V_B$ from the vehicle battery to the transistor circuits 222, 223. The second transistor circuit 222 includes a transistor $TR_3$ which is turned on in response to the first distribution signal $K_1$ from distribution circuit 200 such that a transistor $TR_4$ is made conductive to produce a first drive signal for energizing the coil 21a of clutch mechanism 21 under conduction of the transistor $TR_2$. The transistor $TR_3$ is turned off in response to disappearance of the first distribution signal $K_1$ such that the transistor $TR_4$ is made nonconductive to cease generation of the first drive signal therefrom.

The third transistor circuit 223 includes a transistor $TR_5$ which is turned on in response to the second distribution signal $K_2$ from distribution circuit 200 such that each of transistors $TR_6$, $TR_7$ is made conductive to produce a second drive signal from a collector of transistor $TR_7$ for rotating the motor 20 clockwisely. The transistor $TR_5$ is turned off in response to disappearance of the second distribution signal $K_2$ such that each of transistors $TR_6$, $TR_7$ is made nonconductive to cease generation of the second drive signal therefrom. The third transistor circuit 223 also includes a transistor $TR_8$ which is turned on in response to the third distribution signal $K_3$ from distribution circuit 200 such that each of transistors $TR_9$, $TR_{10}$ is made conductive to produce a third drive signal from a collector of transistor $TR_{10}$ for rotating the motor 20 counterclockwisely. The transistor $TR_8$ is turned off in response to disappearance of the third distribution signal $K_3$ such that each of transistors $TR_9$, $TR_{10}$ is made nonconductive to cease generation of the third drive signal therefrom. In addition, nonconduction of transistor $TR_2$ ceases generation of each of the first to third drive signals.

OPERATION

When the vehicle starts to travel on a flat road upon depression of the accelerator pedal 14 and the speed control apparatus is ready for its operation, the throttle valve 12 remains at the actual opening angle defined by the depression of accelerator pedal 14. Each of the reversible motor 20 and clutch mechanism 21 is also maintained inoperative because the drive circuit 220 may not yet produce any drive signals under control of the distribution circuit 200 based on disappearance of an operation signal $m_a$ from control signal generator 140, as understood from the above discription.

At this stage, the cancellation circuit 150 is controlled by the timing signal generator 130 to repetitively produce release signals $r_1$, $r_2$ in accordance with clock signals $C_2$ from clock circuit 110, and the control signal generator 140 is responsive to the release signals $r_1$, $r_2$ to maintain disappearance of the above-noted operation signal $m_a$, as previously described. The acceleration calculation circuit 180 is also controlled by the timing signal generator 130 to repetitively produce a difference signal w and sign signals $w_1$, $w_2$ in accordance with clock signals $C_1$ from clock circuit 110, and the shift control circuit 210 generates shift control signals $t_1$, $t_2$ under control of timing signal generator 130 and cancellation circuit 150, as previously described. The acceleration output shifter 240 is responsive to the shift control signals $t_1$, $t_2$ from shift control circuit 210 to select the first to fifth high-order digits from a value of the binary coded signal w so as to produce a binary signal $w_b$ indicative of the selected first high-order digit and a binary coded signal $w_a$ indicative of the selected second to fifth high-order sigits, as previously described. In addition, the digit signal generator 250 inhibits generation of the binary signal $w_b$ from output shifter 240 therethrough as a digit signal $w_{bo}$ under control of the timing signal generator 130, cancellation circuit 150 and calculation circuit 180.

When the set switch 40 is temporarily closed upon reach of the actual vehicle speed to a desired or first command value of for instance 50 Km/h after disappearance of the release signals $r_1$, $r_2$ due to acceleration of the vehicle, the frequency divider 141c of control signal generator 140 produces a set signal $c_0$ in accordance with clock signals $C_3$ from clock circuit 110 upon receiving an electric signal c appearing from set switch 40. When RS-flip flop 141 generates a high level signal i (see FIG. 5) under control of NAND-gate 141e and inverter 141d responsive to the set signal $c_0$ from frequency divider 141c, the high level signal i is applied to D-flip flop 142a. In this instance, the cancellation circuit 150 generates shift command signals $s_3$, $s_4$, $s_5$, $s_7$ to maintain generation of each of the shift control signals $t_1$, $t_2$ from shift control circuit 210, as previously described.

Assuming that immediately after appearance of set signal $c_0$, the timing signal generator 130 produces a gate signal $b_1$ with a period of time $T_1$ and also produces latch signals $d_1$, $e_1$, a preset signal $f_1$ and reset signals $g_1$, $h_1$, as previously described, the latch circuit 186 of calculation circuit 180 is responsive to the latch signal $d_1$ to latch therein an absolute value of a time difference counted previously in the counter circuit 183 and to produce the latched value as an eight-bit difference signal w, and simultaneously D-flip flop 187 acts to generate a sign signal $w_2$ in response to a sign signal $w_1$ which has been issued from D-flip flop 185. In this instance, because of acceleration of the vehicle, the sign signals $w_1$ and $w_2$ have respectively low and high levels defining the positive sign. Then, the acceleration output shifter 240 is responsive to the shift control signals $t_1$, $t_2$ from shift control circuit 210 to select the first to fifth high-order digits from the value of difference signal w such that it generates a binary signal $w_b$ indicative of the selected first high-order digit and a binary coded signal $w_a$ indicative of the selected second to fifth high-order digits. Subsequently, D-flip flop 251 of digit signal generator 250 produces a low level signal in response to the latch signal $e_1$ from timing signal generator 130 during generation of the sign signal $w_1$ with low level from calculation circuit 180.

When D-flip flop 142a of control signal generator 140 receives the preset signal $f_1$ during generation of the high level signal i from RS-flip flop 141, it produces a command-speed set signal j which is applied to D-flip flop 142b, RS-flip flops 143, 147, OR-gate 149a and command-speed set circuit 160. Then, RS-flip flop 147 is responsive to the command-speed set signal j to produce a high level signal, and simultaneously RS-flip flop 149 is controlled by OR-gate 149a to generate an operation signal $m_a$ (see FIG. 5), whereas RS-flip flop 143 serves to inhibit generation of an operation signal $m_b$ (see FIG. 5) therefrom. Then, the distribution circuit 200 is responsive to the operation signal $m_a$ from RS-flip flop 149 to produce a first distribution signal $K_1$ upon receipt of which the drive circuit 220 produces a first drive signal to energize the electromagnetic coil 21a of clutch mechanism 21. As a result, the clutch mechanism 21 is engaged due to the energization of coil 21a to connect the rack-and-pinion 22 with the motor 20. Additionally, the high level signal i from RS-flip flop 141 of control signal generator 140 disappears in response to the reset signal $g_1$ from timing generator 130.

When the counter circuit 183 of calculation circuit 180 receives the preset signal $f_1$ from timing signal generator 130, it acts to preset therein a value counted previously in the counter circuit 182 as a sixteen-bit binary coded signal and starts to count down the preset value at the trailing edge of gate signal $b_1$ in accordance with clock signals $C_1$ through NOR-gate 181 from clock circuit 110. When the down counter 192 of correction signal generator 190 presets therein the difference signal $w_a$ from acceleration output shifter 240 under control of inverter 191 responsive to the preset signal $f_1$, it produces a high level signal therefrom and starts to count down a value of the preset signal $w_a$ in accordance with clock signals $C_7$ through AND-gate 192a from clock signal generator 260. In this instance, the preset circuit 262 of clock signal generator 260 produces a binary coded signal indicative of a desired value in relation to manipulation of digital code switch 262a. Then, NOR-gate 198 is responsive to the high level signal from down counter 192 to produce a first correction signal $z_1$ with a low level, and the exclusive OR-gate 197 receives the high level signal from counter 192 under control of AND-gate 195 related to disappearance of the operation signal $m_b$ and acts to produce a high level signal in response to which OR-gate 199 generates a second correction signal $z_2$ with a high level. When the distribution circuit 200 receives the correction signals $z_1$ and $z_2$ respectively with low and high levels, it produces a third distribution signal $K_3$ in relation to the high level of sign signal $w_2$ to generate a third drive signal from the drive circuit 220, as previously described. Thus, the motor 20 is rotated counterclockwise upon receiving the third drive signal from drive circuit 220 and operates the rack-and-pinion 22 during engagement of clutch mechanism 21 to decrease the actual opening angle of throttle valve 12. As a result, restraint to the actual acceleration of the vehicle is initiated due to the decrease of the throttle opening angle to control the actual vehicle speed toward the desired value.

When the counter circuit 164 of command-speed set circuit 160 is reset by AND-gate 163 responsive to the reset signal $h_1$ from timing signal generator 130 during generation of the command-speed set signal j, it starts to count clock signals $C_2$ through AND-gate 162 and NOR-gate 161 from clock circuit 110 at the trailing edge of gate signal $b_1$, and simultaneously the counter circuit 182 of calculation circuit 180 is reset and starts to count clock signals $C_1$ through NOR-gate 181 from clock circuit 110 at the trailing edge of gate signal $b_1$. In this instance, the shift control circuit 210 cooperates with the cancellation circuit 150 to maintain generation of each of the shift control signals $t_1$, $t_2$ because the actual vehicle speed is over 40 Km/h and under 58.9 Km/h. Upon completing the above-noted count down operation, the counter 192 of correction signal generator 190 drops the high level signal therefrom to a low level, and the correction signal $z_2$ from OR-gate 199 also drops to a low level under control of the exclusive OR-gate 197. Then, the third distribution signal $K_3$ from distribution circuit 200 disappears in response to the correction signal $z_2$ with low level, and simultaneously the third drive signal from drive circuit 220 disappears. Thus, the counterclockwise rotation of motor 20 is stopped due to disappearance of the third drive signal from drive circuit 220 to cease the above-noted decrease of the throttle opening angle.

When the timing signal generator 130 produces a gate signal $b_2$ with a period of time $T_2$ and also produces latch signals $d_2$, $e_2$, a preset signal $f_2$ and reset signals $g_2$, $h_2$, as previously described, the counter circuit 164 of command-speed set circuit 160 acts to complete the count operation thereof at the leading edge of gate signal $b_2$ so as to store therein the counted result as a twelve-bit binary coded signal u indicative of the period of time $T_1$ of gate signal $b_1$, and simultaneously the counter circuit 182 of calculation circuit 180 completes the count operation thereof to produce the counted result as a sixteen-bit binary coded signal indicative of the period of time $T_1$ of gate signal $b_1$. At the same time, the counter circuit 183 of calculation circuit 180 acts to complete the count down operation thereof in such a manner to produce the counted-down result as a twelve-bit binary coded signal indicative of an absolute value of a time difference between the period of time $T_1$ and the previously counted value in the counter circuit 182. At this stage, a sign signal $w_1$ with low level appears from D-flip flop 185 of calculation circuit 180. In addition, the period of time $T_1$ is shorter than the previously counted value in the counter circuit 182 because of acceleration of the vehicle, and the period of time $T_2$ is assumed to be shorter than the Period of time $T_1$ in spite of the above-nited restraint to acceleration of the vehicle.

When the latch signal $d_2$ appears from the timing signal generator 130, as previously described, D-flip flop 142b of control signal generator 140 acts to produce a high level signal k (see FIG. 5) during generation of the command-speed set signal j from D-flip flop 142a, the latch circuit 186 of calculation circuit 180 latches therein the above-noted binary coded signal indicative of the period of time $T_1$ from counter circuit 183 to generate the latched signal as a difference signal w, and D-flip flop 187 is responsive to the sign signal $w_1$ with low level from D-flip flop 185 to produce a sign signal $w_2$ with a high level or a positive sign. Then, the output shifter 240 produces a binary signal $w_b$ and a binary coded signal $w_a$ in relation to the first to fifth high-order digits of the value of the difference signal w, as previously described. When the latch signal $d_2$ appears from the timing signal generator 130, as previously described, D-flip flop 252 of digit signal generator 250 acts to generate a high level signal during generation of the low level signal from D-flip flop 251, and AND-gate 254 acts to generate a high level signal upon receiving the binary signal $w_b$ from output shifter 240 under control of exclusive OR-gate 253 responsive to the low and high level signals respectively from D-flip flops 251, 252. At this stage, D-flip flop 256 is responsive to the reset signal $h_1$ to produce a high level signal under control of AND-gate 255 related to disappearance of at least one of shift command signals $s_3$, $s_6$ from cancellation circuit 150. Thus, AND-gate 257 generates a high level or digit signal $w_{bo}$ upon receiving the high level signals respectively from AND-gate 254 and D-flip flop 256 and maintains generation of the digit signal $w_{bo}$ in relation to a low level signal appearing from D-flip flop 251 in response to the latch signal $e_2$ from timing signal generator 130 and the sign signal $w_1$ which is continuously held at low level.

When the preset signal $f_2$ appears from the timing signal generator 130, as previously described, the counter circuit 171 of calculation circuit 170 presets therein the binary coded signal u indicative of the period of time $T_1$ from set circuit 160 and starts to count down the value of preset signal u at the trailing edge of gate signal $b_2$ in accordance with clock signals $C_2$ through NOR-gate 161 from clock circuit 110. Simultaneously, the counter circuit 183 of calculation circuit 180 presets therein the binary coded signal indicative of the period of time $T_1$ from counter circuit 182 and starts to count down the value of the preset signal at the trailing edge of gate signal $b_2$ in accordance with clock signals $C_1$ through NOR-gate 181 from clock circuit 110. At this stage, D-flip flop 173 of calculation circuit 170 acts to produce a low level signal, and D-flip flop 185 produces a sign signal $w_1$ with a low level.

When the preset signal $f_2$ appears from the timing signal generator 130, as described above, the down counter 192 of correction signal generator 190 presets therein the binary coded signal $w_a$ from acceleration output shifter 240 and the digit signal $w_{bo}$ from digit signal generator 250 as a binary coded signal $w_{ba}$ to produce a high level signal therefrom and starts to count down the value of the preset signal $w_{ba}$ in accordance with clock signals $C_7$ through AND-gate 192a from clock signal generator 260 so that NOR-gate 198 and OR-gate 199 act to produce first and second correction signals $z_1$ and $z_2$ with low and high levels respectively. Thus, the drive circuit 220 is controlled by the distribution circuit 200 responsive to the correction signals $z_1$ and $z_2$ respectively with low and high levels in relation to the high level of sign signal $w_2$ to generate a third drive signal upon receipt of which the motor 20 is rotated counterclockwise to further decrease the actual throttle opening angle, as previously described. This results in further restraint to acceleration of the vehicle. Upon completion of the count down operation of counter 192, the second correction signal $z_2$ from OR-gate 199 drops to a low level, and the third drive signal from drive circuit 220 disappears under control of distribution circuit 200 to stop the counterclockwise rotation of motor 20. Additionally, in the calculation circuit 180, the counter circuit 182 is reset by the reset signal $h_2$ from timing signal generator 130 and starts to count clock signals $C_1$ from NOR-gate 181 at the trailing edge of gate signal $b_2$.

When the timing signal generator 130 produces a gate signal $b_3$ with a period of time $T_3$ and also produces latch signals $d_3$, $e_3$, a preset signal $f_3$ and reset signals $g_3$, $h_3$, as previously described, the counter circuit 182 of calculation circuit 180 completes the count operation thereof at the leading edge of gate signal $b_3$ to generate a binary coded signal indicative of the period of time $T_2$ of gate signal $b_2$, and simultaneously each of the counter circuits 171, 183 of respective calculation circuits 170, 180 completes the count down operation thereof to generate a binary coded signal indicative of an absolute value of the time difference $(T_1-T_2)$. At this stage, the period of time $T_3$ of gate signal $b_3$ is assumed to be a little shorter than that of gate signal $b_2$. When the latch signal $d_3$ appears from timing signal generator 130, as previously described, RS-flip flop 143 of control signal generator 140 acts to generate an operation signal $m_b$ (see FIG. 5) under control of D-flip flop 142c during generation of the high level signal k from D-flip flop 142b, tha latch circuit 174 of calculation circuit 170 latches therein the binary coded signal indicative of the time difference $|T_1-T_2|$ from counter circuit 171 to produce the latched signal as a difference signal v, and D-flip flop 175 produces a sign signal $v_1$ with a low level or a positive sign in relation to the low level signal from D-flip flop 173. At the same time, the latch circuit 186 of calculation circuit 180 latches therein the binary coded signal indicative of the time difference $|T_1-T_2|$ from counter circuit 183 to produce the latched signal as a difference signal w, and D-flip flop 187 receives the sign signal $w_1$ with low level from D-flip flop 185 to produce a sign signal $w_2$ with a high level or a positive sign. Then, the speed-difference output shifter 230 is responsive to the shift control signals $t_1$, $t_2$ from shift control circuit 210 to select the first to eighth high-order digits from the value of difference signal v from calculation circuit 170 so as to generate a binary coded signal $v_a$ indicative of the selected first to eighth high-order digits. At the same time, the acceleration output shifter 240 serves to produce a binary signal $w_b$ and a binary coded signal $w_a$ in relation to the first to fifth high-order digits of the value of difference signal w, as previously described.

When the preset signal $f_3$ appears from the timing signal generator 130, as previously described, the down counter 192 of correction signal generator 190 is controlled by the inverter 191 to preset therein the binary coded signal $w_a$ from output shifter 240 and the digit signal $w_{bo}$ from digit signal generator 250 as a binary coded signal $w_{ba}$, and simultaneously the down counter 193 of correction signal generator 190 is controlled by the inverter 191 to preset therein the binary coded signal $V_a$ from output shifter 230. Then, the down counter 192 produces a high level signal therefrom and starts to count down the value of binary coded signal $w_{ba}$ in accordance with clock signals $C_7$ from AND-gate 192a. Meanwhile, the down counter 193 produces a high level signal therefrom when inhibited in its count down operation by AND-gate 193a responsive to the high level signal from counter 192 and a high level signal from exclusive OR-gate 194 based on the sign signals $v_1$ and $w_2$ with low and high levels respectively from calculation circuits 170 and 180. When AND-gate 195 produces a high level signal in response to the high level signal from down counter 193 during generation of the operation signal $m_b$ from control signal generator 140, OR-gate 199 acts to generate a second correction signal $z_2$ with a high level under control of AND-gate 196 responsive to the high level signals from exclusive OR-gate 194 and AND-gate 195. In addition, NOR-gate 198 acts to produce a first correction signal $z_1$ with a low level due to the above-noted function of exclusive OR-gate 194.

Then, the distribution circuit 200 is responsive to the correction signals $z_1$ and $z_2$ respectively with low and high levels from correction signal generator 190 to produce a third distribution signal $K_3$ in relation to the high level of sign signal $w_2$. Thus, the drive circuit 220 is responsive to the third distribution signal $K_3$ from distribution circuit 200 to conduct the counterclockwise rotation of motor 20 so as to decrease the actual throttle opening angle. Upon completing the count down operation, the down counter 192 produces a low level signal therefrom, and the down counter 193 is permitted in its count down operation by AND-gate 193a to continuously generate the high leve signal therefrom and starts to count down the value of binary coded signal $v_a$ in accordance with clock signals $C_6$ through AND-gate 193b from clock signal generator 260. Thus, the correction signal $z_2$ from OR-gate 199 is maintained in its high level under control of AND-gate 196 responsive to high level signals respectively from exclusive OR-gate 194 and AND-gate 195. Upon completion of the count down operation, the counter 193 acts to produce a low level signal therefrom to drop the second correction signal $z_2$ from OR-gate 199 to a low level under control of AND-gate 196 and exclusive OR-gate 197. As a result, the drive circuit 220 cooperates with the distribution circuit 200 responsive to the second correction signal $z_2$ with low level from OR-gate 199 to stop the counterclockwise rotation of motor 20 and also the decrease of the throttle opening angle.

Assuming that during the above-noted operation, the period of time $T_2$ of gate signal $b_2$ is shorter than the period of time $T_1$ of gate signal $b_1$ and longer than a period of time of a gate signal $b_l$ issued from timing signal generator 130 prior to the gate signal $b_1$, the counter circuit 183 of calculation circuit 180 drops the high level signal from counter 183d to a low level upon completing its count down operation conducted in response to the preset signal $f_1$ from timing signal generator 130. Then, D-flip flop 185 of calculation circuit 180 is controlled by NOR-gate 184 responsive to the low level signal from counter 183d to generate a sign signal $w_1$ with a high level upon receipt of which the counter circuit 180 starts to count up the remainder of the clock signals $C_1$ from NOR-gate 181 and completes the count up operation at the leading edge of the gate signal $b_2$. Subsequently, the sign signal $w_2$ from D-flip flop 187 drops to a low level in response to the latch signal $d_2$ from timing signal generator 130 during generation of the sign signal $w_1$ with high level from D-flip flop 185. When D-flip flop 251 of digit signal generator 250 produces a high level signal in response to the latch signal $e_2$ from timing signal generator 130 and the sign signal $w_1$ with high level from D-flip flop 185, the high level signal appearing from AND-gate 254 drops to a low level under control of the exclusive OR-gate 253 responsive to the high level signals respectively from D-flip flops 251, 252.

When the counter 171c of counter circuit 171 of calculation circuit 170 generates a low level signal upon completing the count down operation of counter circuit 171 conducted responsive to the preset signal $f_2$ from timing signal generator 130, D-flip flop 173 generates a high level signal, and the counter circuit 171 starts to count up the remainder of the clock signals $C_2$ from NOR-gate 161. Furthermore, the drive circuit 220 cooperates with the distribution circuit 200 in relation to the sign signal $w_2$ with low level to rotate the motor 20 clockwisely so as to increase the actual opening angle of throttle valve 12. This means restraint to deceleration of the vehicle.

When the gate, latch and preset signals $b_3$, $d_3$, $e_3$ and $f_3$ appear from the timing signal generator 130, as previously described, the counter circuits 171 and 183 of calculation circuit 170 and 180 complete respectively the count up and down operations thereof at the leading edge of gate signal $b_3$ and generate respectively a binary coded signal indicative of the time difference $|T_1 - T_2|$. At this stage, each of the sign signals $v_1$, $w_2$ respectively from D-flip flops 175, 185 is maintained at a high level in response to the latch signal $d_3$. The high level signal from D-flip flop 252 of digit signal generator 250 drops to a low level in response to the latch signal $d_3$ during generation of the high level signal from D-flip flop 251, and the high level signal from D-flip flop 251 drops to a low level in response to the latch signal $e_3$ during generation of the sign signal with low level. Then, AND-gate 257 acts to inhibit generation of a digit signal $w_{bo}$ therefrom under control of exclusive OR-gate 253 and AND-gate 254 responsive to the low level signals respectively from D-flip flops 251, 252.

Thereafter, the down counter 192 of correction signal generator 190 generates a high level signal under control of the inverter 191 responsive to the preset signal $f_3$ and starts to count down the value of the binary coded signal $w_a$ from output shifter 240 in accordance with clock signals $C_7$, and simultaneously the down counter 193 generates a high level signal and starts to count down the value of the binary coded signal $v_a$ from output shifter 230 in accordance with clock signals $C_6$ under control of AND-gate 193a and exclusive OR-gate 194 based on the sign signals $v_1$, $w_2$ respectively with high level. Subsequently, NOR-gate 198 serves to generate a correction signal $z_1$ with a low level in response to the high level signal from down counter 192, the exclusive OR-gate 197 produces a low level signal upon receiving the high level signal from down counter 192 under control of AND-gate 195 responsive to the high level signal from down counter 193 during generation of the operation signal $m_b$, and AND-gate 196 produces a low level signal under control of exclusive OR-gate 194 responsive to the sign signals $v_1, w_2$ respectively with high level. This means that OR-gate 199 generates a correction signal $z_2$ with a low level.

In case counting time of down counter 192 to the value of binary coded signal $w_a$ dependent on clock signals $C_7$ is longer than that of down counter 193 to the value of binary coded signal $v_a$ dependent on clock signals $C_6$, the down counter 193 completes its count down operation prior to that of down counter 192 to generate a low level signal upon receipt of which the exclusive OR-gate 197 rises the correction signal $z_2$ from OR-gate 199 to a high level under control of AND-gate 195. Then, the drive circuit 220 cooperates with the distribution circuit 200 responsive to the correction signals $z_1, z_2$ respectively with low and high levels in relation to the sign signal $w_2$ with high level to rotate the motor 20 counterclockwise so as to decrease the actual throttle opening angle. When the down counter 192 produces a low level signal upon completing its count down operation, the correction signal $z_2$ from OR-gate 199 drops to a low level under control of the exclusive OR-gate 197, and the drive circuit 220 cooperates with the distribution circuit 200 to halt the counterclockwise rotation of motor 20 so as to stop decrease of the actual throttle opening angle.

In case counting time of down counter 192 to the value of binary coded signal $w_a$ dependent on clock signals $C_7$ is shorter than that of down counter 193 to the value of binary coded signal $v_a$ dependent on clock signals $C_6$, the down counter 192 completes its count down operation prior to that of down counter 193 to generate a low level signal upon receipt of which NOR-gate 198 and exclusive OR-gate 197 rise the correction signals $z_1$ and $z_2$ respectively to a high level. Then, the drive circuit 220 cooperates with the distribution circuit 200 responsive to the correction signals $z_1, z_2$ respectively with high level in relation to the sign signal $w_2$ with high level to rotate the motor 20 clockwisely so as to increase the actual throttle opening angle. When the down counter 193 produces a low level signal upon completing its count down operation, the correction signal $z_2$ from OR-gate 199 drops to a low level under control of AND-gate 195 and exclusive OR-gate 197, and the drive circuit 220 cooperates with the distribution circuit 200 to halt the clockwise rotation of motor 20 so as to stop increase of the actual throttle opening angle. In addition, description of the other operation is eliminated because it is the same as that of the above-noted operation.

As easily understood from the above description, when a sign of the sign signal $w_1$ from calculation circuit 180 changes into the other sign over periods of time of a pair of gate signals $b_l$ successively appearing from timing signal generator 130 after actuation of the set switch 40 at the vehicle speed of not less than 29.4 Km/h and under 58.9 Km/h, the actual opening angle of throttle valve 12 is increased or decreased in dependence on the signal-width of correction signal $z_2$ defined by the value of the binary coded signal $w_a$ or the value $|w_a \pm v_a|$ of binary coded signals $w_a, v_a$. This smoothly facilitates or restrains the rate of increase of the vehicle speed without undesired control caused by erroneous detections of speed sensor 30 related to mechanical vibrations of the vehicle, skidding of the vehicle wheel or the like and maintains the vehicle speed in the desired value. When the sign of the sign signal $w_1$ is maintained identical over periods of time of the successive gate signals $b_l$ described above after actuation of the set switch 40 at the vehicle speed of not less than 29.4 Km/h and under 58.9 Km/h, the actual throttle opening angle is increased or decreased in dependence on the signal-width of correction signal $z_2$ defined by the value of the binary coded signal $w_{ba}$ or the value $|w_{ba} \pm v_a|$ of binary coded signals $w_{ba}, v_a$. This smoothly facilitates or restrains the rate of continuous increase of the vehicle speed and maintains the vehicle speed to the desired value.

In this case, assuming that the above-noted actuation of set switch 40 is conducted at the vehicle speed of not less than 58.9 Km/h and under 88.3 Km/h or at the vehicle speed of not less than 88.3 Km/h and under 117.7 Km/h, each value of the binary coded signals $v_a$, $w_a$ and binary signal $w_b$ is shifted one by one in its digit from high-order to low-order in accordance with increase of the vehicle speed. This means to compensate lowering of resolution in calculation of each of calculation circuits 170, 180 in spite of shortening of a period of time responsive to increase of the vehicle speed. As a result, the correction signal generator 190 always calculates precise values of the binary coded signals $v_a$, $w_a$ and digit signal $w_{bo}$ so that the drive circuit 220 cooperates with the distribution circuit 200 to realize smooth control of the vehicle speed to the desired value.

In case an operator of the vehicle wishes to increase the first command speed up to a higher or second command value of not less than 88.3 Km/h and under 117.7 Km/h, the accleration switch 60 is manually closed to produce an electric signal which is reshaped by the wave shaper 146a of control signal generator 140 into a reshaped signal. When the inverter 146b of control signal generator 140 is responsive to the reshaped signal from wave shaper 146a to produce an acceleration signal n (see FIG. 4), the distribution circuit 200 acts to generate a series of pulse signals as a second distribution signal $K_2$ in accordance with clock signals $C_4, C_5$ from clock circuit 110, and the drive circuit 220 produces a second drive signal in accordance with the second distribution signal $K_2$ to intermittently rotate the motor 20 in the clockwise direction for increasing the actual throttle opening angle. In addition, RS-flip flop 141 acts to generate a high level signal i under control of NAND-gate 141e and OR-gate 146c responsive to the reshaped signal from wave shaper 146a.

When the vehicle speed reaches the second command value, the acceleration switch 60 is released to cease generation of the reshaped signal from wave shaper 146a of control signal generator 140, and the inverter 146b also ceases generation of the acceleration signal n therefrom. Thus, the drive circuit 220 is controlled by the distribution circuit 200 responsive to disappearance of the acceleration signal n to stop the clockwise rotation of motor 20 so as to cease the increase of the throttle opening angle. When a preset signal $f_l$ appears from timing signal generator 130 after disappearance of the acceleration signal n, D-flip flop 142a of control signal generator 140 produces newly a command-speed set signal j during generation of the high level signal i from RS-flip flop 141 so that the actual throttle opening angle is controlled under the substantially same operation as that of the above-noted description to maintain the vehicle speed to the second command value.

When the cancel switch 50 is manually closed to produce a release signal h, the wave shaper 145a of control signal generator 140 reshapes the release signal h into a reshaped signal h₀. Then, RS-flip flop 149 ceases generation of the operation signal m_a therefrom under control of OR-gates 145b, 149b responsive to the reshaped signal h₀ from wave shaper 145a, and simultaneously the first transistor circuit 221 of drive circuit 220 blocks the electric power supply from the vehicle battery to the second and third transistor circuits 222, 223. Then, the distribution circuit 200 ceases generation of each of the distribution signals K₁ to K₃ in response to disappearance of the operation signal m_a, and the drive circuit 220 deactivates automatic control of the throttle actuator AC. When an operation signal m_a appears again from RS-flip flop 149 upon closure of the resume switch 70 after release of the cancel switch 50, the distribution circuit 200 is permitted to activate the second and third transistor circuits 222, 223 to control the throttle actuator AC, as previously described. In case the actual vehicle speed exceeds the maximum value controllable by the speed control system, a release signal r₂ is produced from the cancellation circuit 150 to deactivate the drive circuit 220 in the same operation as that of the cancel switch 50.

For practice of the present invention, the electric reversible motor 20 of throttle actuator AC may be replaced with various sources of power such as an oil-hydraulic motor, a pneumatic motor and the like. In this case, the rack-and-pinion 22 may be also replaced with a cam-mechanism.

Although in the above embodiment the speed sensor 30 having the reed switch 32 is adapted as means for detecting a vehicle speed, it may be replaced with a sensor in the form of an AC generator or a photo-coupler having a photo transistor and a light emission diode. Furthermore, the command-speed set circuit 160 may be replaced with an electronic circuit in which a binary coded signal indicative of a period of time corresponding to a desired vehicle speed is produced by manipulation of a digital code switch independently of the clock circuit 110, timing signal generator 130 and control signal generator 140.

While in the above embodiment the present invention is adapted to the throttle valve 12 of internal combustion engine 10, it may be also adapted to a diesel engine in which the quantity of fuel supplied from a fuel source into the combustion chamber of the diesel engine is controlled by the throttle actuator AC under control of the control circuit EC.

Having now fully set forth both structure and operation of a preferred embodiment of the concept underlying the present invention, verious other embodiments as well as certain variations and modifications of the embodiment herein shown and described will obviously occur to those skilled in the art upon becoming familiar with said underlying concept. It is to be understood, therefore, that within the scope of the appended claims, the invention may be practiced otherwise than as specifically set forth herein.

What is claimed is:

1. A speed control system for an automotive vehicle driven by a prime mover under control of control means for controlling the fuel supply into said engine, the control system comprising:

first means for producing a speed signal indicative of the actual speed of the vehicle;

second means for producing a command signal indicative of a desired speed of the vehicle;

third means for calculating a first difference between values of the command and speed signals and for producing a first differential signal indicative of the calculated first difference;

fourth means for calculating a second difference between values of the preceding and following speed signals and for producing a second differential signal indicative of an absolute value of the calculated second difference and a sign signal indicative of one of positive and negative signs of the calculated second difference;

fifth means for adjusting the value of the first differential signal in accordance with the absolute value of the second differential signal in relation to the sign of the sign signal and for producing a correction signal indicative of the adjusted value of the first differential signal;

sixth means responsive to the correction signal for producing a control signal in relation to the sign of the sign signal; and actuator means for actuating said control means in response to the control signal;

wherein the improvement comprises means for adjusting the absolute value of the second differential signal to a smaller value when the sign of the sign signal changes within a duration defined by the preceding and following speed signals, and wherein said fifth means is arranged to adjust the value of the first differential signal in accordance with the adjusted smaller value of the second differential signal in relation to the sign of the sign signal and to produce a correction signal indicative of the adjusted value of the first differential signal.

2. A speed control system for an automotive vehicle driven by a prime mover under control of control means for controlling the fuel supply into said engine, the control system comprising:

first means for producing a timing signal with a period of time responsive to the actual speed of the vehicle;

second means for producing a command signal indicative of a predetermined period of time defined by a desired speed of the vehicle;

third means for calculating a first time difference between the predetermined period of time and an instant period of time of the timing signal and for producing a first differential signal indicative of an absolute value of the calculated first time difference;

fourth means for calculating a second time difference between respective instant periods of time of the preceding and following timing signals and for producing a second differential signal indicative of an absolute value of the calculated second time difference and a sign signal indicative of one of positive and negative signs of the calculated second time difference;

fifth means for adjusting the absolute value of the first differential signal in accordance with the absolute value of the second differential signal in relation to the sign of the sign signal and for producing a correction signal indicative of the adjusted absolute value of the first differential signal;

sixth means responsive to the correction signal for producing a control signal in relation to the sign of the sign signal; and actuator means for actuating said control means in response to the control signal;

wherein the improvement comprises means for adjusting the absolute value of the second differential signal to a smaller value when the sign of the sign signal changes within a duration defined by the preceding and following timing signals, and wherein said fifth means is arranged to adjust the absolute value of the first differential signal in accordance with the adjusted smaller value of the second differential signal in relation to the sign of the sign signal and to produce a correction signal indicative of the adjusted absolute value of the first differential signal.

3. A speed control system as claimed in claim 2, wherein said fifth means is arranged to be applied in response to the timing signal with a first binary coded siganl representing a low-order digit portion of the absolute value of the second differential signal, and wherein said means for adjusting the absolute value of the second differential signal is arranged to be supplied in response to the timing signal with the sign signal and a second binary coded signal representing the remaining high-order digit portion of the absolute value of the second differential signal for permitting the second binary coded signal supplied to said fifth means when the sign of the sign signal is the same within the duration defined by the preceding and following timing signals and for prohibiting the second binary coded signal supplied to said fifth means when the sign of the sign signal changes within the duration.

4. A speed control system as claimed in claim 3, wherein said means for adjusting the absolute value of the second differential signal includes:
 a first logic circuit arranged to be supplied in response to the timing signal with the sign signal for discriminating whether or not the sign of the sign signal changes within the duration and for producing an output signal therefrom only when the sign of the sign signal is the same within the duration; and
 a second logic circuit arranged to be supplied with the second binary coded signal for permitting the second binary coded signal supplied to said fifth means in response to the output signal from said first logic circuit and for prohibiting the second binary coded signal supplied to said fifth means due to lack of the output signal from said first logic circuit.

5. A speed control system as claimed in claim 2, further comprising:
 seventh means for generating a first shift control signal when the instant period of time of the timing signal represents a value in a predetermined low speed range and for generating a second shift control signal when the instant period of time represents a value in a predetermined high speed range; and
 eighth means responsive to the first shift control signal for selecting a high-order digit portion of the absolute value of the second differential signal and for producing a first binary coded signal indicative of the selected high-order digit portion of the absolute value, said eighth means being responsive to the second shift control signal for selecting a low-order digit portion of the absolute value of the second differential signal and for producing a second binary coded signal indicative of the selected low-order digit portion of the absolute value;
 wherein said fifth means is arranged to be supplied in response to the timing signal with a third binary coded signal representing a low-order digit portion of either one of the first and second binary coded signals; and
 wherein said means for adjusting the absolute value of the second differential signal is arranged to be supplied in response to the timing signal with the sign signal and a fourth binary coded signal representing the remaining high-order digit portion of either one of the first and second binary coded signals for permitting the fourth binary coded signal supplied to said fifth means when the sign of the sign signal is the same within a duration defined by the preceding and following timing signals and for prohibiting the fourth binary coded signal supplied to said fifth means when the sign of the sign signal changes within the duration.

6. A speed control system as claimed in claim 5, wherein said means for adjusting the absolute value of the second differential signal includes;
 a first logic circuit arranged to be supplied in response to the timing signal with the sign signal for discriminating whether or not the sign of the sign signal changes within the duration and for producing an output signal therefrom only when the sign of the sign signal is the same within the duration; and
 a second logic circuit arranged to be supplied with the fourth binary coded signal for permitting the fourth binary coded signal applied to said fifth means in response to the output signal from said first logic circuit and for prohibiting the fourth binary coded signal supplied to said fifth means due to lack of the output signal from said first logic circuit.

7. A speed control method for an automotive vehicle driven by a prime mover under control of control means for controlling the fuel supply into said engine, the control method comprising the steps of:
 producing a speed signal indicative of the actual speed of the vehicle;
 producing a command signal indicative of a desired speed of the vehicle;
 calculating a first difference between values of the speed signal and the command signal to produce a first differential signal indicative of the calculated first difference;
 calculating a second difference between respective values of the preceding and following speed signals to produce a second differential signal indicative of an absolute value of the calculated second difference and a sign signal indicative of one of positive and negative signs of the calculated second difference;
 adjusting the absolute value of the second differential signal to a smaller value when the sign of the sign signal changes within a duration defined by the preceding and following speed signals;
 adjusting the value of the first differential signal in accordance with either the absolute value or the adjusted smaller value of the second differential signal in relation to the sign of the sign signal to produce a correction signal indicative of the adjusted value of the first differential signal;
 producing a control signal in relation to the sign of the sign signal in response to the correction signal; and
 actuating said control means in response to the control signal.

8. A speed control method for an automotive vehicle driven by a prime mover under control of control means for controlling the fuel supply into said engine, the control method comprising the steps of:

producing a timing signal responsive to the actual speed of the vehicle;

producing a command signal indicative of a desired speed of the vehicle;

calculating a first time difference between values of the timing signal and the command signal to produce a first differential signal indicative of an absolute value of the calculated first time difference;

calculating a second time difference between respective values of the preceding and following timing signals to produce a second differential signal indicative of an absolute value of the calculated second time difference and a sign signal indicative of one of positive and negative signs of the calculated second time difference;

adjusting the absolute value of the second differential signal to a smaller value when the sign of the sign signal changes within a duration defined by the preceding and following timing signals;

adjusting the absolute value of the first differential signal in accordance with either the absolute value or the adjusted smaller value of the second differential signal in relation to the sign of the sign signal to produce a correction signal indicative of the adjusted value of the first differential signal;

producing a control signal in relation to the sign of the sign signal in response to the correction signal; and actuating said control means in response to the control signal.

9. A speed control method as claimed in claim 8, wherein the step of adjusting the absolute value of the second differential signal to a smaller value comprises the steps of:

producing a first binary coded signal representing a low-order digit portion of the absolute value of the second differential signal;

producing a second binary coded signal representing the remaining high-order digit portion of the absolute value of the second differential signal when the sign of the sign signal is the same within a duration defined by the preceding and following timing signals; and ceasing to produce the second binary coded signal when the sign of the sign signal changes within the duration; and wherein the step of adjusting the absolute value of the first differential signal is the step of adjusting the absolute value of the first differential signal in accordance with values of the first and second binary coded signals in relation to the sign of the sign signal to produce a correction signal indicative of the adjusted value of the first differential signal.

* * * * *